Sept. 25, 1962 R. E. BELL ETAL 3,055,585
INDUSTRIAL COMPUTING SCALE
Filed June 21, 1956 13 Sheets-Sheet 1
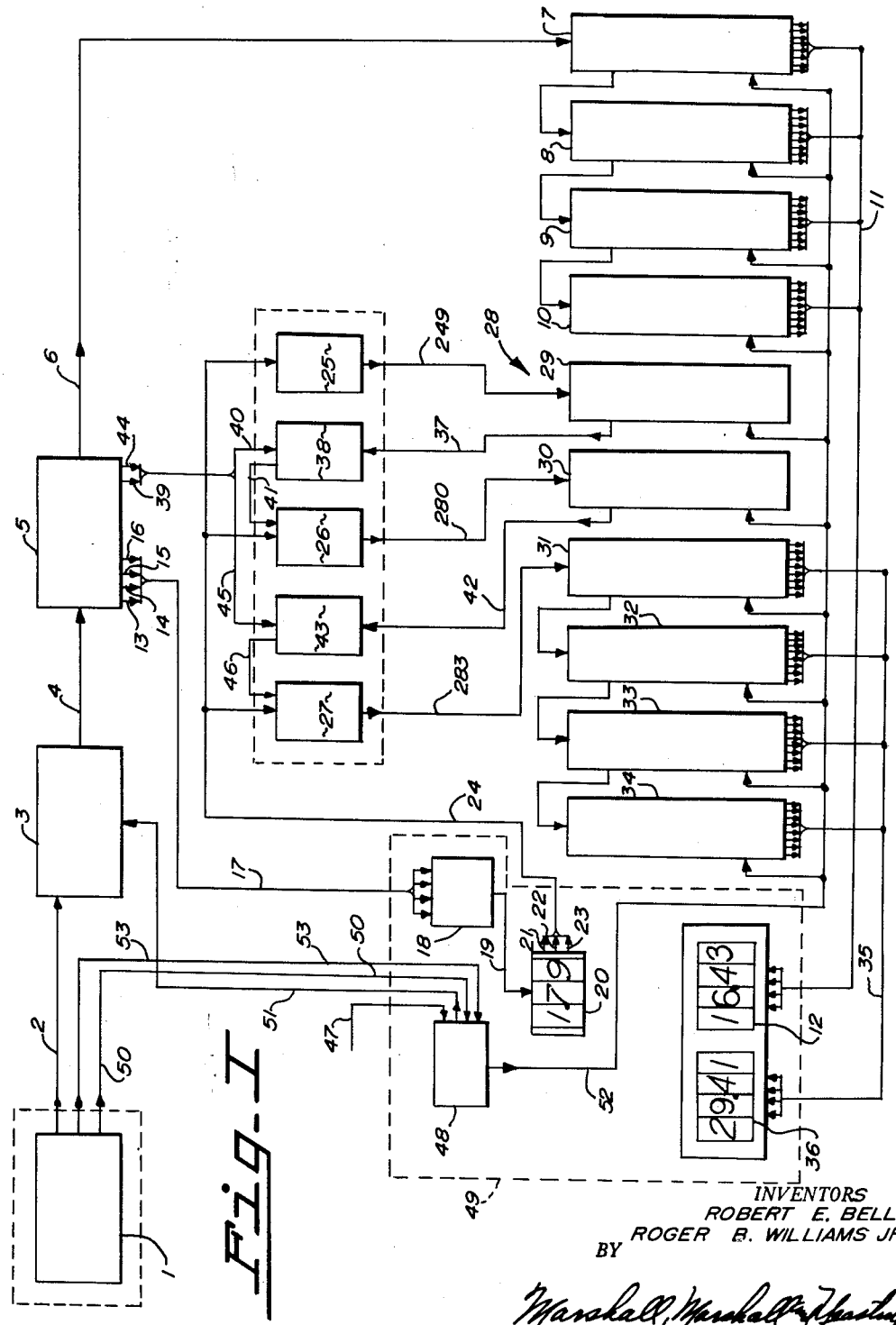
INVENTORS
ROBERT E. BELL
ROGER B. WILLIAMS JR.
BY
*Marshall, Marshall & Hasting*
ATTORNEYS Sept. 25, 1962 R. E. BELL ETAL 3,055,585
INDUSTRIAL COMPUTING SCALE
Filed June 21, 1956 13 Sheets-Sheet 2
_Fig_ II
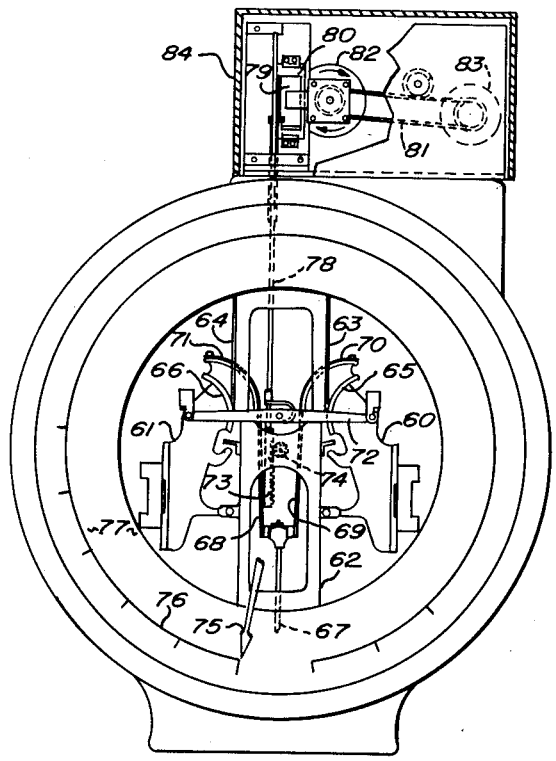
INVENTORS
ROBERT E. BELL
ROGER B. WILLIAMS JR
BY
Marshall, Marshall & Hastings
ATTORNEYS Sept. 25, 1962     R. E. BELL ETAL     3,055,585
INDUSTRIAL COMPUTING SCALE
Filed June 21, 1956     13 Sheets-Sheet 3
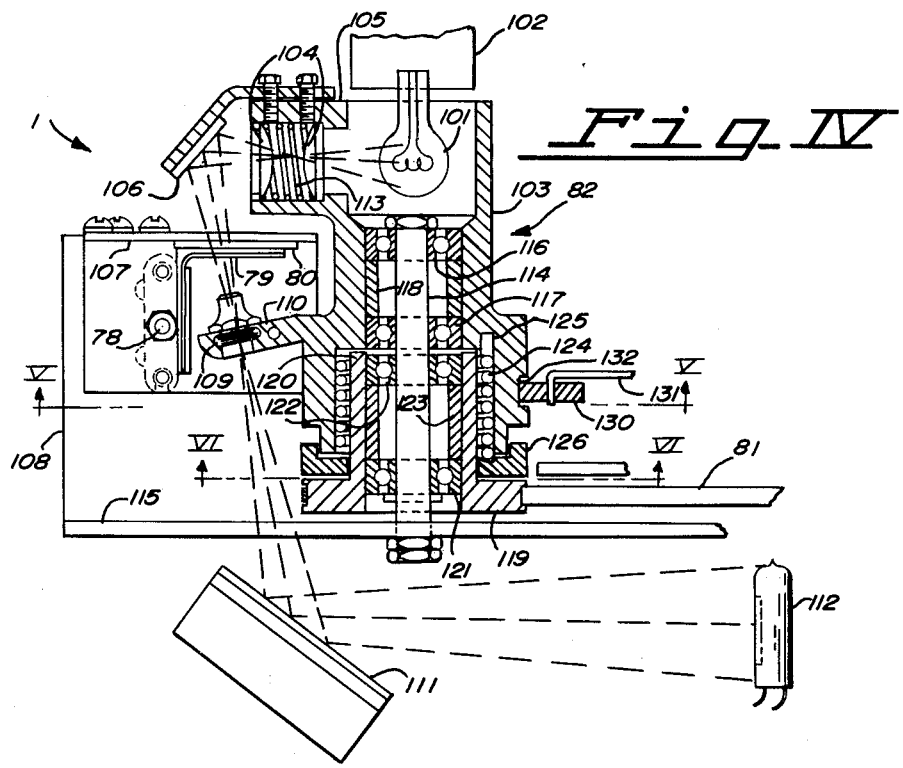
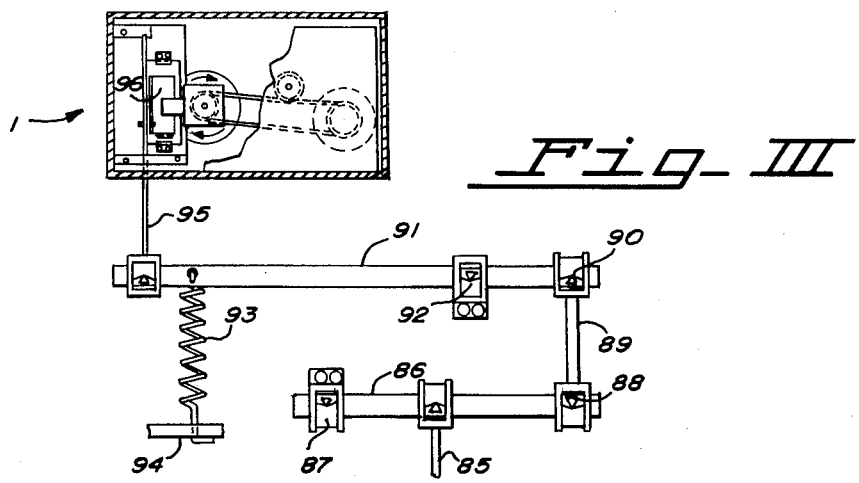
INVENTORS
ROBERT E. BELL
ROGER B. WILLIAMS JR.
BY
ATTORNEYS Sept. 25, 1962 R. E. BELL ETAL 3,055,585
INDUSTRIAL COMPUTING SCALE
Filed June 21, 1956 13 Sheets-Sheet 4
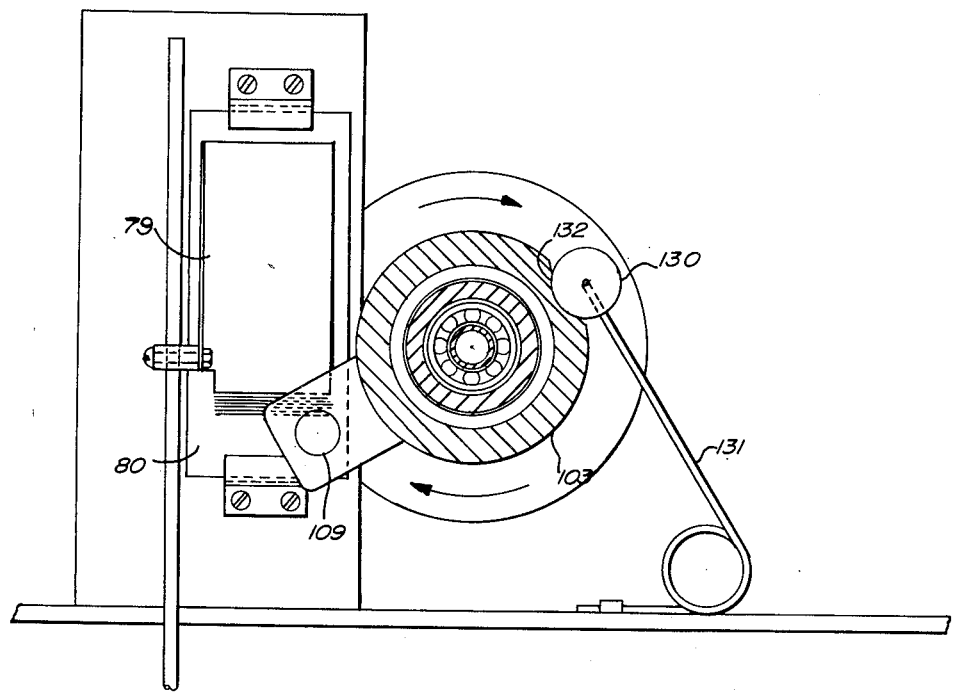
_Fig-V_
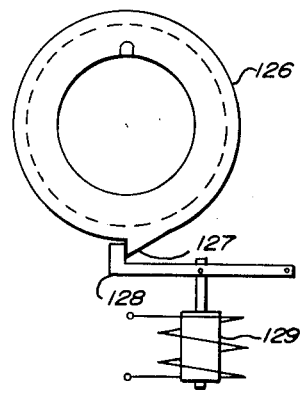
_Fig-VI_
INVENTORS
ROBERT E. BELL
ROGER B. WILLIAMS JR.
BY
*Marshall, Marshall & Hasting*
ATTORNEYS

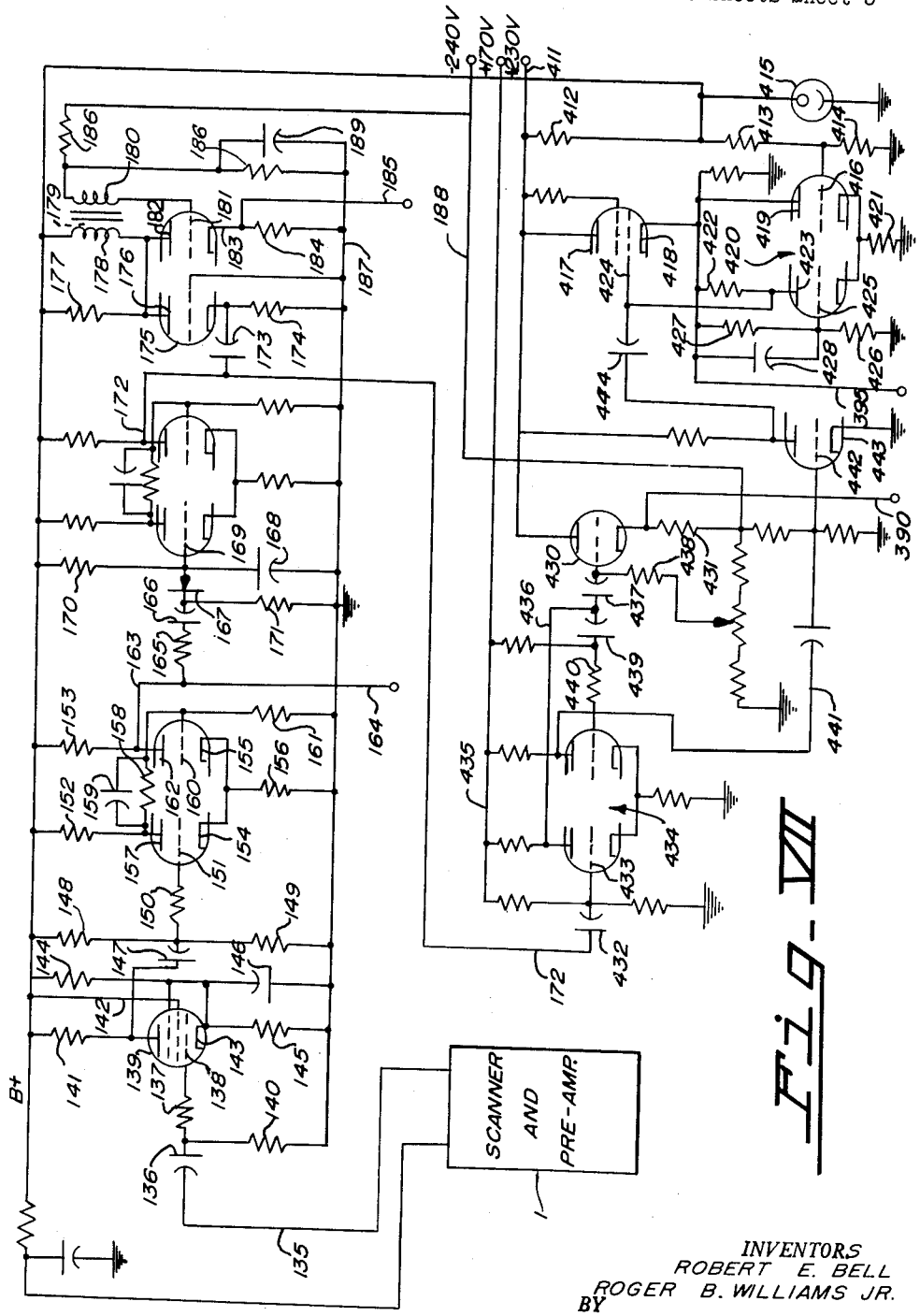

Sept. 25, 1962        R. E. BELL ETAL        3,055,585
INDUSTRIAL COMPUTING SCALE
Filed June 21, 1956                13 Sheets-Sheet 6
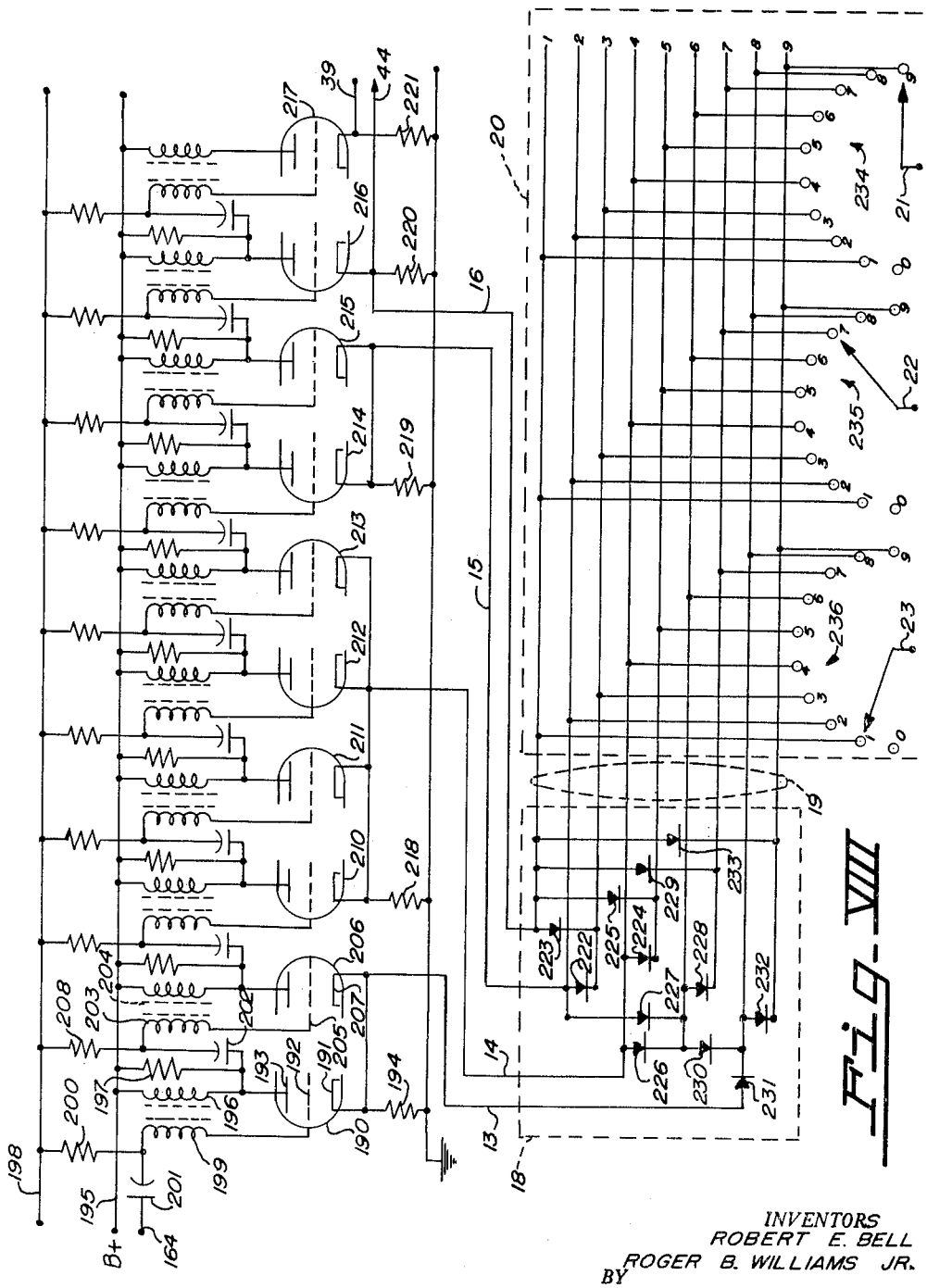
INVENTORS
ROBERT E. BELL
ROGER B. WILLIAMS JR.
BY
Marshall, Marshall & Heasting
ATTORNEYS

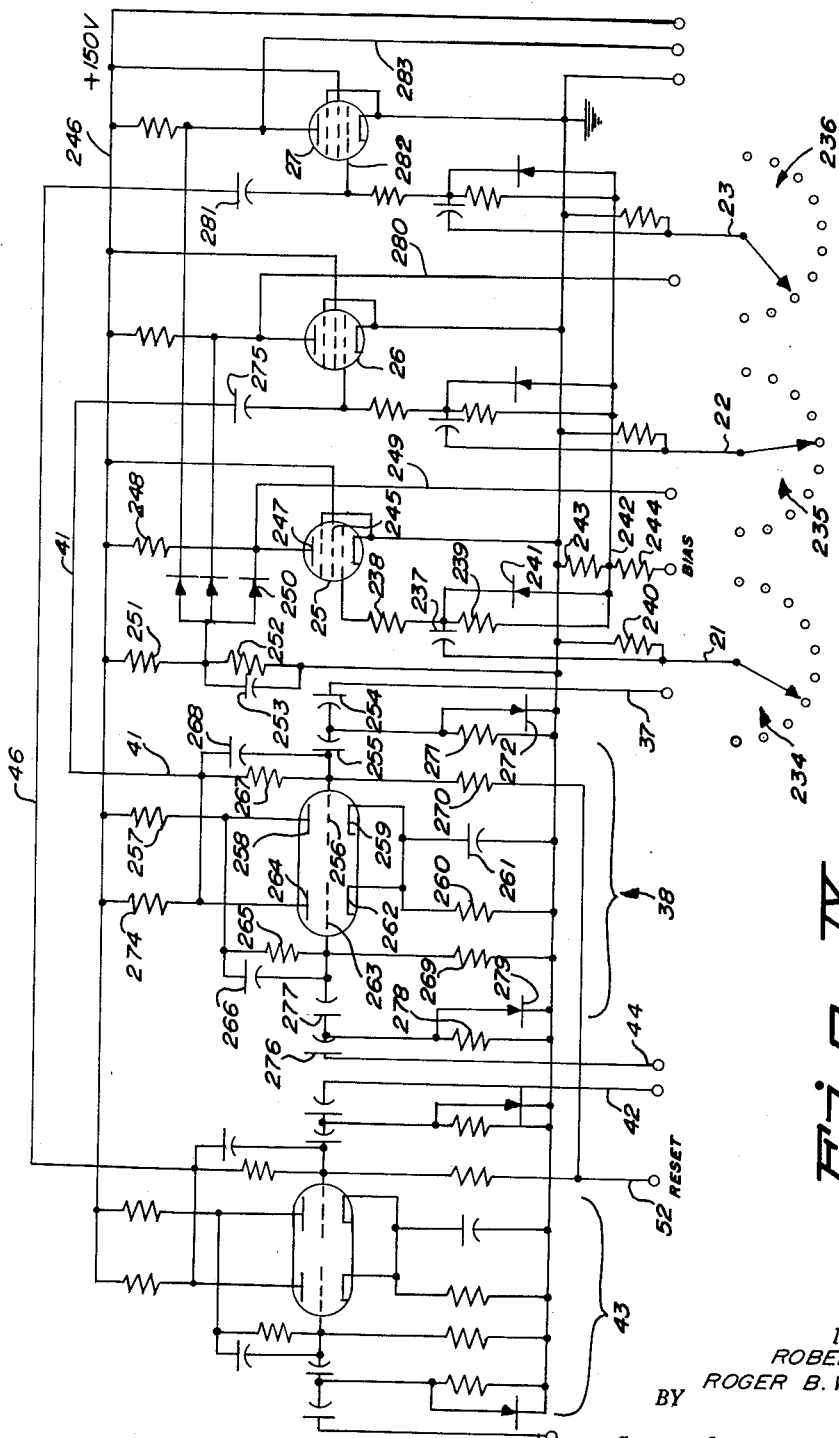
Fig. IX

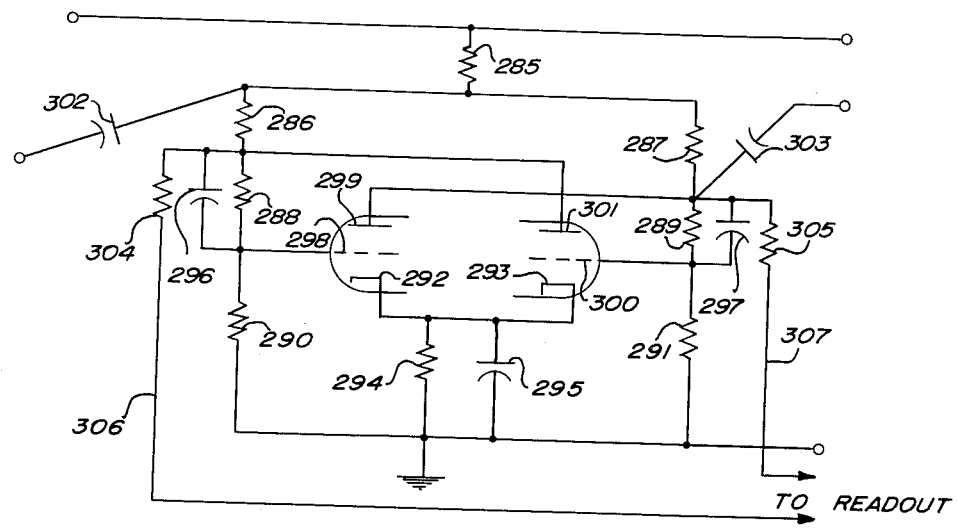
Fig. X
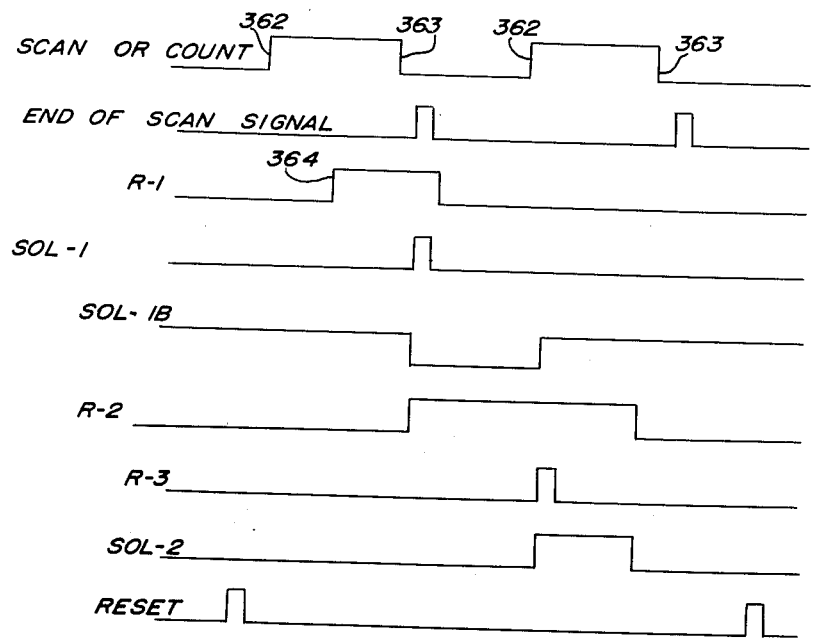
Fig. XI

Sept. 25, 1962 R. E. BELL ET AL 3,055,585
INDUSTRIAL COMPUTING SCALE
Filed June 21, 1956 13 Sheets-Sheet 9
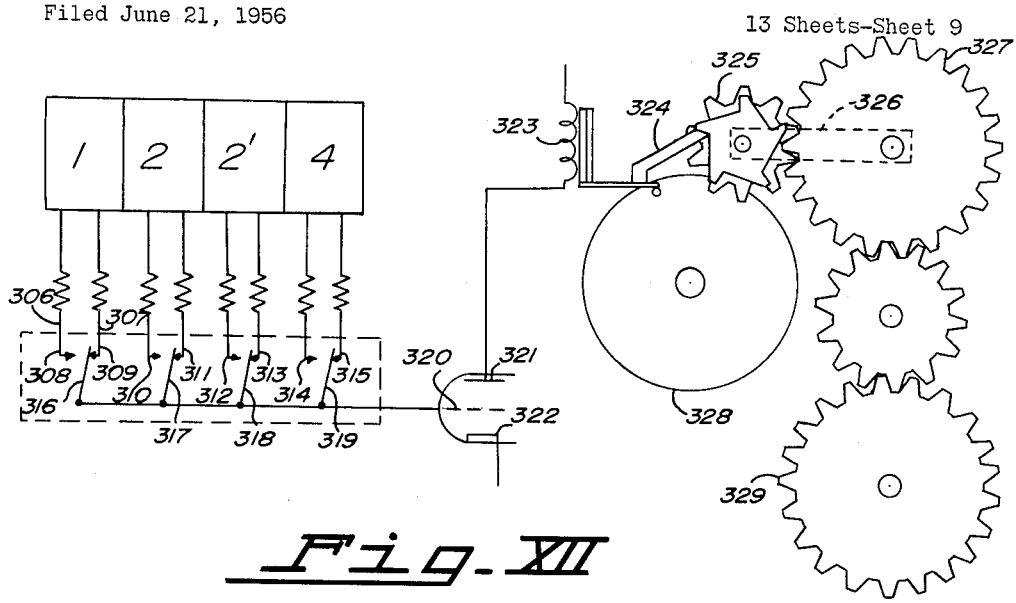
Fig. XII
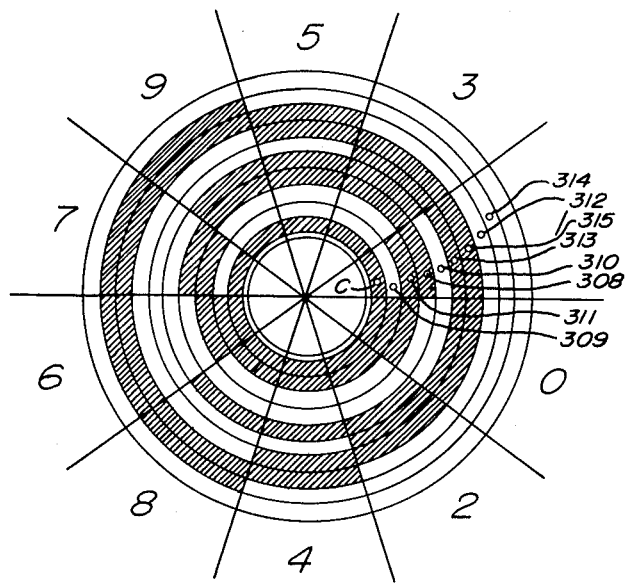
Fig. XIII
INVENTORS
ROBERT E. BELL
ROGER B. WILLIAMS JR.
BY
ATTORNEYS Sept. 25, 1962 R. E. BELL ETAL 3,055,585
INDUSTRIAL COMPUTING SCALE
Filed June 21, 1956 13 Sheets-Sheet 10
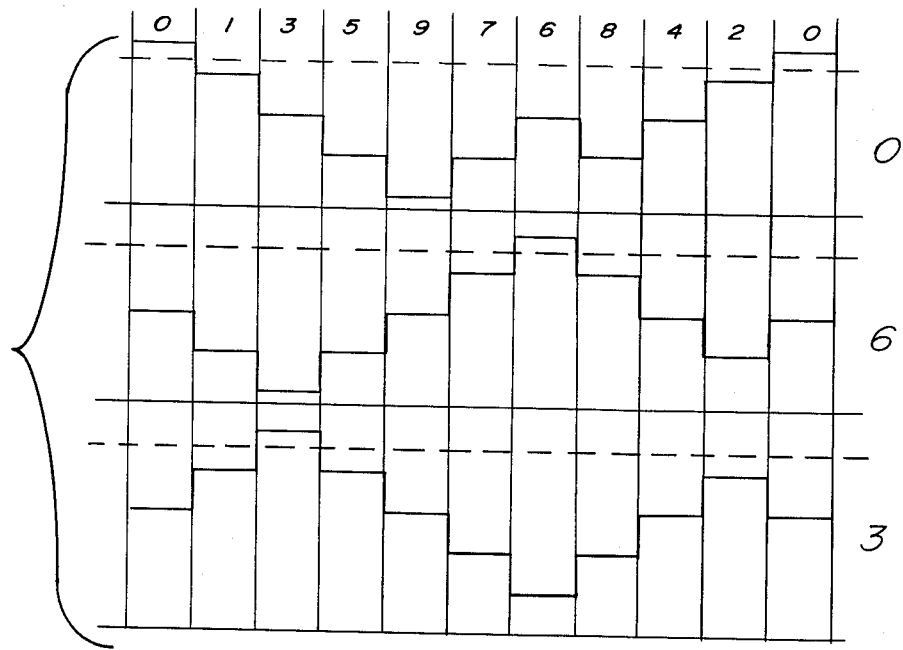
Fig. XIV
Fig. XV
INVENTORS
ROBERT E. BELL
ROGER B. WILLIAMS JR.
BY
ATTORNEYS Sept. 25, 1962 R. E. BELL ETAL 3,055,585
INDUSTRIAL COMPUTING SCALE
Filed June 21, 1956 13 Sheets-Sheet 11
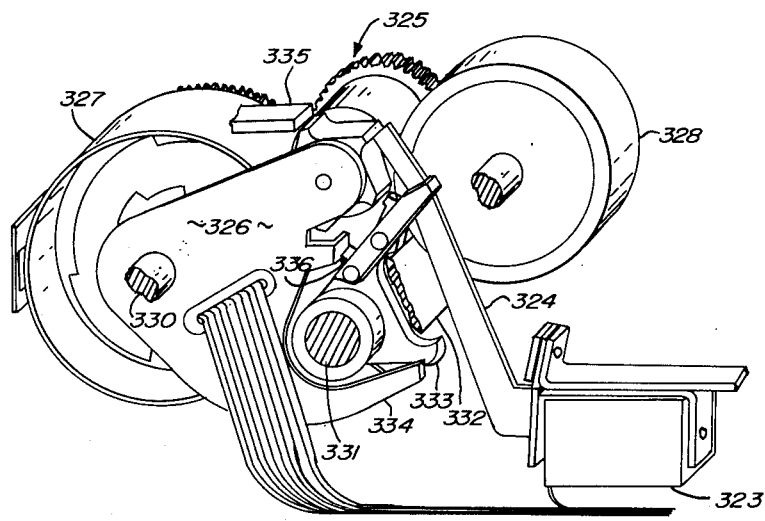
Fig. XVI
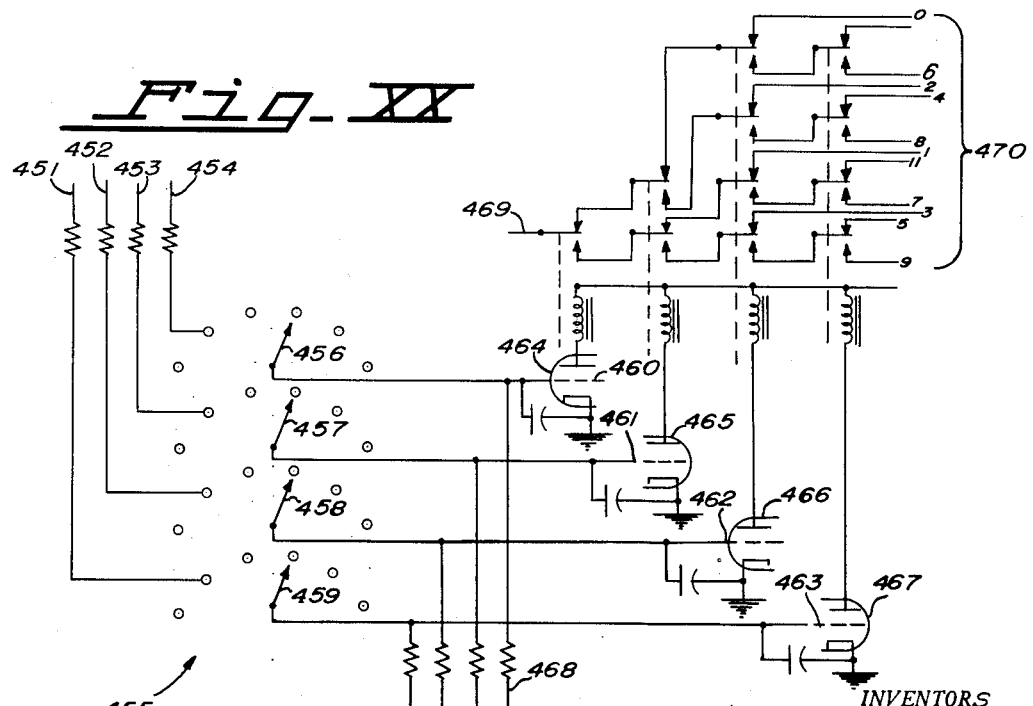
Fig. XX
INVENTORS
ROBERT E. BELL
ROGER B. WILLIAMS JR.
BY
Marshall, Marshall & Yeasting
ATTORNEYS

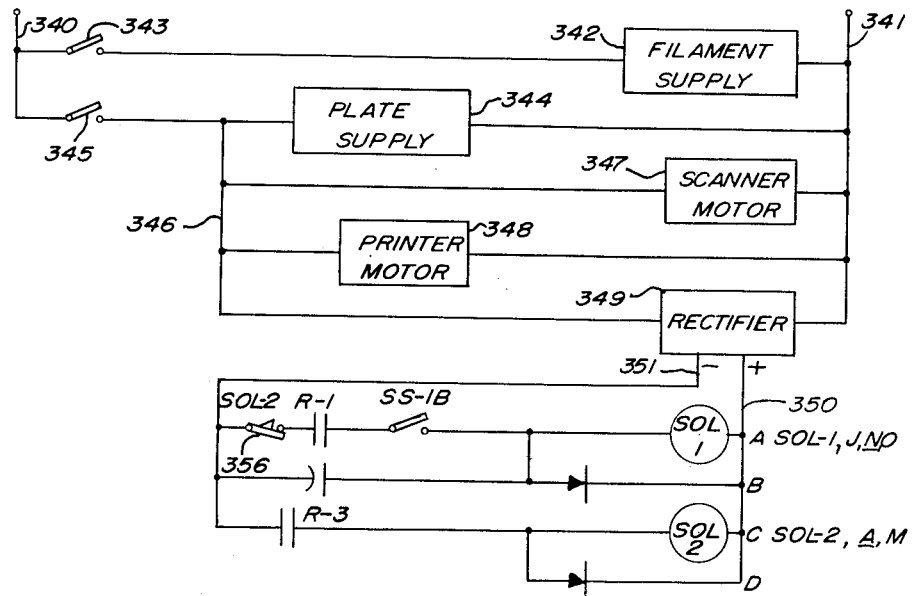
_Fig. XVII_
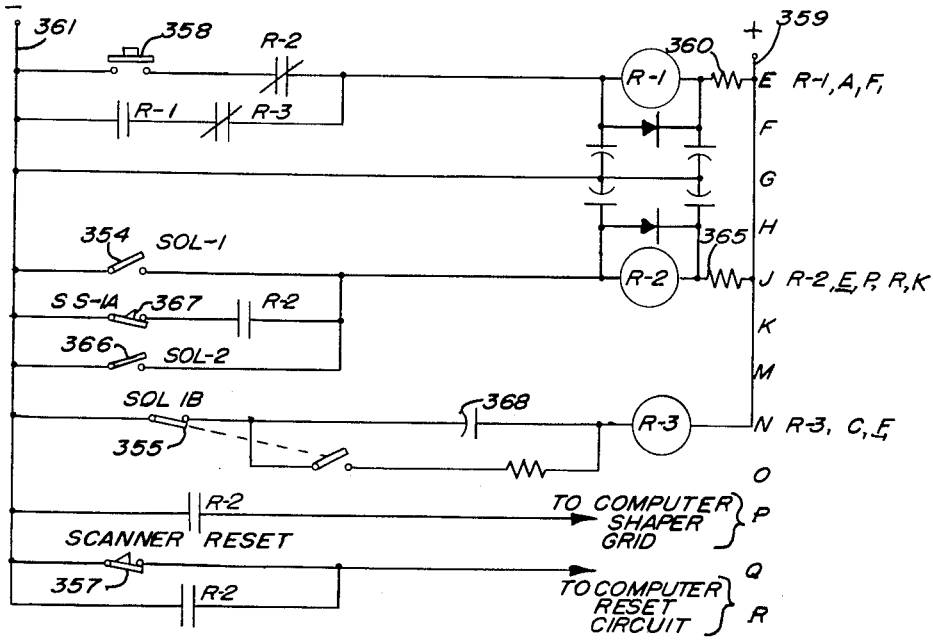
_Fig. XVIII_
INVENTORS
ROBERT E. BELL
ROGER B. WILLIAMS JR.
BY Marshall, Marshall & Heasting
ATTORNEYS

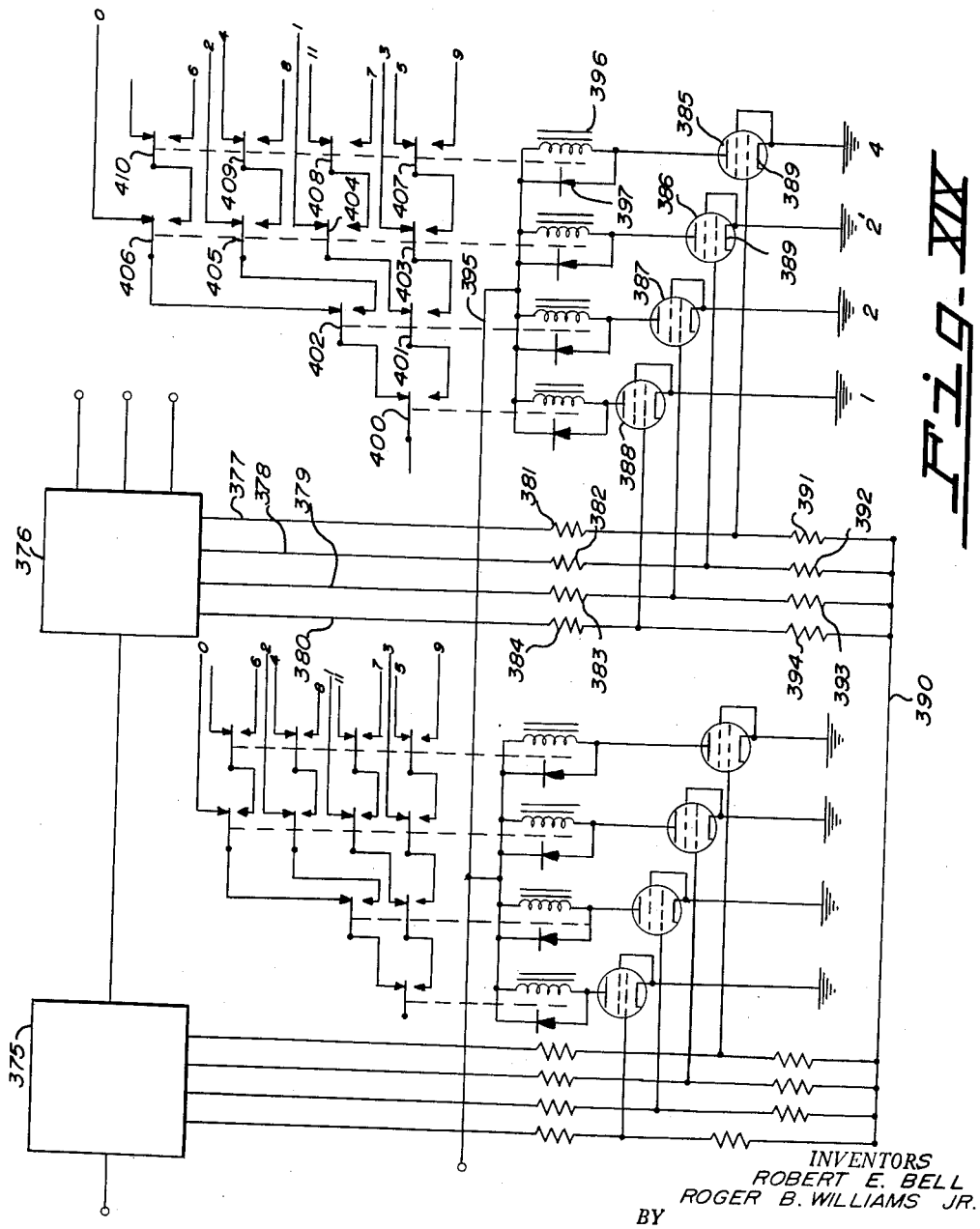

United States Patent Office 3,055,585
Patented Sept. 25, 1962

3,055,585
INDUSTRIAL COMPUTING SCALE
Robert E. Bell and Roger B. Williams, Jr., Toledo, Ohio, assignors, by mesne assignments, to Toledo Scale Corporation, Toledo, Ohio, a corporation of Ohio
Filed June 21, 1956, Ser. No. 592,932
3 Claims. (Cl. 235—160)

This invention relates to improvements in condition measuring and indication apparatus and will be particularly set forth and explained as applied to a weighing scale.

Because of the time and possibility of error involved when human operators read the indication given by a condition responsive apparatus, such as a weighing scale, and manually record such indication it is desirable that such reading and recording be done by completely automatic means. It is furthermore desirable in many installations that the recording means be located remote from the apparatus. It is furthermore desirable in many cases that the indication of the condition responsive and indicating apparatus be multiplied by an arbitrarily selected factor. For example, if it is known that a particular material has a moisture content of two percent it may be desired to multiply the reading of a weighing scale by ninety-eight percent so that the net or dry weight of the material is the figure actually shown and recorded. Another use involving multiplication by an arbitrarily selected factor may be found in retail stores where it is desired to compute the money value of a package of goods according to the weight of that particular package and the price per unit of weight of the material. Still another such use is in the counting of small similar pieces by weight wherein the number of pieces per unit of weight is predetermined for each class of piece and that number is the arbitrarily selected factor, the resulting computed amount being the number of pieces in the lot on the weighing scale.

The principal object of the invention is to provide a condition measuring and indicating apparatus which is automatically capable of giving the complete indication of the weight or condition, and if desired the product of such weight or condition multiplied by an arbitrarily selected factor, either digitally or in printed form as may be desired.

A further object of the invention is to give this digital or printed indication at a place remote from the place of use of the apparatus if desired.

The invention consists in condition measuring and indicating apparatus having a movable condition responsive member along the path of which there extends a stationary chart having graduations which are variably exposed according to the position of such condition responsive member, said chart being read by photoelectric means to produce, in correspondence with the exposed chart graduations, a series of photoelectric impulses which are counted by a first electronic counting means, and which trigger a pulse generator that delivers for each photoelectric impulse a selected number of pulses to a second electronic counting means.

A preferred form of the invention is illustrated in the accompanying drawings, in which:

FIGURE I is a schematic block diagram illustrating the general organization of the equipment for reading a condition responsive member of a condition measuring and indication apparatus and indicating such reading in digital form suitable for recording and also multiplying such reading by an arbitrarily selected factor and indicating the product also in a form suitable for visual indication or recording.

FIGURE II is a front elevation, with parts broken away, showing a weighing scale load counterbalancing mechanism and a reading device mounted thereon.

FIGURE III is a diagrammatic illustration of a spring scale lever system equipped with a reading device.

FIGURE IV is a horizontal section of the reading device, showing the optical system and the mechanical arrangement for moving the optical system relative to the chart.

FIGURE V is a vertical section taken along the line V—V of FIGURE IV to show the cooperation of the reading device and the chart.

FIGURE VI is a section taken substantially along the line VI—VI of FIG. IV showing one method of controlling the reading device.

FIGURE VII is a schematic wiring diagram of the electronic circuits adapted to be used with the reading device or scanner shown in FIGURE IV.

FIGURE VIII is a schematic wiring diagram of a multiplier pulse generator, combining matrix, and factor setting device suitable for use in the reading and indicating mechanism illustrated in FIGURE I.

FIGURE IX is a schematic wiring diagram of certain amplifier circuits used between the multiplier circuit illustrated in FIGURE VIII and electronic counters as indicated in FIGURE I.

FIGURE X is a schematic wiring diagram of one stage of an electronic counter suitable for use in the counter decades shown in FIGURE I.

FIGURE XI is a timing diagram illustrating the sequence of events that occurs during a reading of the scale.

FIGURE XII is a schematic representation of one decade of a counter and the equipment for providing visual indication of the count stored in such counter.

FIGURE XIII is a diagram of a commutator disk suitable for use in the mechanism shown in FIGURE XII.

FIGURE XIV is a table showing the current conduction condition of the various stages of the electronic counter decade shown in FIGURE XII for various counts.

FIGURE XV is a diagram representing the voltages appearing on the output lead of the commutator represented schematically in FIGURE XII and employed to control the indicating mechanism.

FIGURE XVI is a pictorial illustration of a preferred form of the mechanism for mechanically indicating the count stored in a counter decade.

FIGURE XVII is a schematic diagram of the electrical circuits required for driving various portions of the reading and recording device.

FIGURE XVIII is a schematic wiring diagram of the interlocking circuits employed to control the sequence of operations indicated in FIGURE XI.

FIGURE XIX is a schematic wiring diagram illustrating a circuit adapted to continuously energize selected leads according to a count periodically inserted into an electronic counter.

FIGURE XX is a schematic diagram of electronic circuits suitable for scanning a plurality of counters and energizing, for each step, certain of a plurality of leads according to the count represented in the particular counter decade then being scanned.

Referring to FIGURE I, the condition responsive instrument which may be a weighing scale or other measuring device is provided with a scanner or reading device 1 (see also FIGURES IV, V, and VI) that is adapted to generate a series of pulses proportional in number to the numerical value of the reading. These pulses are generated as independent, successive wave trains or trains of pulses and either may be generated continuously, i.e. one pulse train following the other after a short interval of time, or they may be generated in response to a starting or interrogating signal. An interrogating signal may be a demand made by a start button or other control for the reading device to execute a reading cycle.

The pulses generated in the reading device 1 are transmitted over a line 2 to a pulse shaper and wave train identifying mechanism 3 which in turn transmit pulses of sharp definite wave form over a line 4 to a multiplier pulse generator 5. The multiplier pulse generator 5 is used only in those installations or combinations where it is desired to indicate and/or record the product of the reading of the condition responsive member times the selected factor. If such multiplication is not required the multiplier pulse generator 5 is omitted from the circuit and the signals on the lead 4 transmitted directly to a counter input lead 6. When the pulse generator 5 is used it delivers to the counter lead 6 one pulse for each pulse received on the line 4. These pulses on the counter lead 6 are fed to a first decade 7 of a modified binary type counter which is composed of four decades including the decade 7 and other decades 8, 9, and 10 adapted to register the units, tens, hundreds, and thousands places of the indication read by the reading device 1. While the maximum counting and indicating capacity of the counter composed of the decades 7, 8, 9, and 10 is 9,999 counts, the full capacity ordinarily is not used since the ordinary condition responsive element 1 may provide only a thousand or two thousand separate graduations. Thus the decade 10 may only indicate one or two in the thousand's place. It should be realized that the units, tens, hundreds and thousands may represent decimal fractions as well as whole numbers in that a small scale, for example, could be read to a thousandth of a weight unit, either pound or kilogram or if larger and read to a hundredth of a unit could be indicated up to 99 units. As was mentioned, however, the full capacity is seldom used in that a ten unit scale, for example, might be read to the nearest hundredth of a unit wherein the decades 7 and 8 would indicate hundredths and tenths of units while the decade 9 would indicate the whole number of units and the decade 10 the number of ten of units. At the completion of a reading of the condition responsive element by the reading device 1, the count accumulated in the counter comprising decades 7 to 10, inclusive, is transmitted through an output cable 11 which includes a plurality of leads from each counter decade. The voltages transmitted through the cable 11 are transmitted to an indicating device 12 which may provide on dials or number wheels a direct digital indication of the count and may also be arranged to position printing wheels so that printing impressions may be made directly from the indication.

If a direct digital indication only of the reading taken by the reading device 1 of the condition responsive apparatus is all that is desired the instrumentalities so far described are complete and will provide the desired result. However, in many installations it is desired not only to provide the direct digital indication but also to provide an indication of the product of the direct digital reading times an arbitrarily selected factor such as price per unit of weight, pieces per unit of weight, humidity or wetness factors, etc. To provide this additional information the pulse generator 5 constituting means for generating a predetermined number of voltage pulses for each received pulse is arranged, as described later, to provide for each pulse on the line 4 an output of two pulses on an output line 13, four pulses on an output line 14, two pulses on an output line 15, and one pulse on an output line 16. These are transmitted through a cable 17 to a diode switching matrix or combining network 18 referred to as a diode matrix. The pulses transmitted through the cable 17 into the diode matrix 18 are combined therein to energize a set of nine leads appearing in a cable 19 in which the first lead carries a single pulse for each voltage pulse supplied to the pulse generator 5, a second carries two pulses, a third 3, and so on up to 9. These leads are connected to selector switches included in a multiplier setting device 20 settable according to the price per unit of weight, pieces per unit of weight, etc.

As many selector switches are employed as there are digits or places in the multiplier to be used. Thus, to provide prices per pound in a three unit decimal money system, such as the dollar, dime, and penny coinage in use in the U.S.A., would require three selector switches. The common arms of the selector switches are connected to output leads 21, 22, or 23 which are carried through a cable 24 to combining amplifiers 25, 26, and 27 which transmit the pulses from the multiplier setting device 20 to corresponding decades of an electronic counting means 28 arranged to count the pulses representing the computed amount and comprising decades 29, 30, 31, 32, 33, and 34. In the example shown in FIGURE I, the condition responsive device 1 may be a weighing scale having a capacity suitable for retail use and in which the minimum graduation is one one-hundredth of a United States unit of weight. Likewise, the multiplier set into the multiplier setting device 20 may be a price represented by dollars, dimes and cents. Since the minimum monetary unit to be indicated is the cent, the first two decades of the amount counting means or counter 28, i.e. the decades 29 and 30 which count the hundredths and tenths of cents respectively appearing in the product, are not connected into an indicating device but merely accumulate these fractional portions of a cent and transmit the accumulated portion into the next higher decade of the counting means 28.

The voltages in the decades 31 to 34, inclusive, representing the cents, dimes, dollars and tens of dollars of the computed amount or product are transmitted through a cable 35, containing eight leads for each decade, to an amount indicator 36.

Since pulses are being transmitted from the pulse generator 5 through the diode matrix 18 and multiplier setting device 20 simultaneously to the leads 21, 22, or 23 and since these pulses are transmitted through the amplifiers 25, 26, and 27 into the counter decades 29, 30, and 31 simultaneously it is necessary, to prevent error, to delay any carry pulse from one decade to a following or higher place decade until after the transmission of pulses through the amplifiers 25, 26, and 27. Since the only place where such error could occur is in the decades that are fed from the amplifiers 26 and 27, arrangements are made so that the carry pulse from the decade 29 is transmitted through a lead 37 to a storage circuit 38 where it is held until the receipt by such storage circuit 38 of a clearing pulse from the pulse generator 5 by way of output terminal 39 and lead 40.

The clearing pulse from the output lead 39 transmitted through the lead 40 occurs once for each pulse transmitted by the lead 4 but occurs later in time than the pulses transmitted to the diode matrix 18 and factor setting device 20. If during the counting of a group of pulses from the diode matrix 18 the counter 29 exceeds its capacity and provides a carry pulse on lead 37, such pulse is stored and then transmitted upon receipt of the clearing pulse to the next amplifier 26 by way of lead 41 and then through such amplifier 26 into the next decade 30 of the amount counter 28. Likewise, carry pulses from the decade 30 are transmitted through a lead 42 to a second storage circuit 43. The carry circuit 43 thus is triggered or conditioned to transmit a pulse whenever it receives a carry pulse from the decade 30 and transmits such pulse upon the receipt of a clearing pulse received from output terminal 44 and transmitted through lead 45. Upon the receipt of the pulse from the output terminal 44 which occurs one unit of time, where a unit of time is the time spacing between pulses from the multiplier 5, after the pulse on the output terminal 39, the carry storage circuit 43, if conditioned by a carry pulse from the decade 30, transmits a pulse over a lead 46 to the combining amplifier 27 and thence to the counter decade 31.

The sequence or timing of the pulses from the pulse generator 5 is such that the output lead 13 transmits the first two pulses generated within the generator occurring during the first two units of time, the output lead 14 transmits the next four pulses occurring on the next four increments of time while the output lead 15 transmits the next two pulses occurring during the next two increments of time while the lead 16 transmits a single pulse occurring at the ninth unit of time. Next, the output terminal 39 transmits the tenth pulse and the output terminal 44 the eleventh pulse these occurring at generally equal intervals of time following the other pulses. The time spread between the pulses is sufficient so that, when a carry has occurred and such carry is stored in the carry storage circuit, for example, the circuit 38, the carry circuit may be tripped or energized by the pulse on the lead 39 and feed its pulse through the amplifier 26 into the decade 30 in time to clear that decade if it has counted to nine and is ready to transmit a carry pulse and have that carry pulse transmitted and stored in the carry circuit 43 in time to be transmitted, by triggering by a pulse from lead 44, so that the second circuit carry is accurately effected regardless of the particular condition in the electronic counting means.

In the operation, after a load is placed on the weighing scale a start signal is provided on a lead 47, which signal is transmitted to a sequence control 48 included in the reading station 49. The reading station 49 includes all of the structure enclosed in the dotted line including the indicators 12 and 36, the multiplier setting device 20, and the diode matrix 18. Upon receipt of the start signal on the line 47 the sequence control 48 transmits a pulse or signal over an output lead 50 leading to the reading device 1 causing it to start a scan. At the same time an unblocking signal is transmitted over a lead 51 to the amplifier and shaper stage so that this stage may transmit the pulses picked up from the reading device 1 and transmit them as properly shaped pulses over the lead 4 to the multiplier pulse generator 5.

Meanwhile, upon the receipt of the start signal on the lead 47 a reset signal is transmitted over lead 52 to each of the counter decades so as to set all of these decades to zero count in anticipation of the next reading. The one exception to the resetting to zero is the counter decade 30 of the amount counter which, in order to round off to the nearest cent in value, is preset to a value of five representing a half cent. Therefore, as soon as a half cent or any number of cents plus a half cent has accumulated the cents counter decade 31 indicates the next cent in value thus rounding off the amount to the nearest cent.

Upon the receipt of an end of scan signal which may be transmitted over a lead 53 from the reading device 1 to the sequence control 48, the sequence control 48 through leads not shown in FIGURE I energizes the visual indicating devices 12 and 36 so that they immediately scan the condition of the counter stages and position the indicating, and printing wheels, if such are used, to positions corresponding to the counts then accumulated in the counter. Since this occurs after the end of the reading scan and since the electronic counters, both the weight indication counters 7 to 10 inclusive and the amount indication counters 31 to 34 inclusive, have reached their final indicating condition, the mechanical indicators 12 and 36 are ready to scan such counters and position themselves according to the indicated amounts.

For convenience, the mode of operation may be briefly reviewed before discussing the respective instrumentalities for carrying out the various functions of the equipment. Briefly, the reading device 1 generates a series of pulses one for each unit of weight. These pulses after proper shaping are transmitted through the pulse generator 5 which delivers a fixed number of pulses on each of several of a plurality of leads for each received pulse. That output lead of the pulse generator which transmits the last pulse generated therein is connected to the electronic counter comprising decades 7, 8, 9, and 10 adapted to count the actual number of pulses transmitted from the reading device 1. The pulse is taken from the last stage of the pulse generator rather than the input lead 4 as a safety feature because, when so connected, there can be no indication of either weight or amount unless the pulse generator 5 is functioning properly.

The pulses, i.e. the fixed number of pulses generated in the pulse generator 5 for each pulse in the series of pulses from the reading device 1, are transmitted through the combining matrix 18 to selector switches in a factor setting device and the selected pulses constituting a predetermined number are transmitted through the amplifiers connected to the first few decades of the amount counter 28. These are totaled in the amount counter 28 which, with indicator 36, indicates the product of the reading of the condition responsive member as read by the reading device 1 and multiplied by the factor set into the factor setting device 20.

The pulses are counted by the electronic counters simultaneously with the reading of the condition responsive member so that the complete counts representing weight or condition and amount or product are ready for use either for visual indication or printing as soon as the reading device has finished its scan or reading of the condition responsive member. Ordinarily the reading device 1 is set to operate at a speed such that the frequency of pulses in the series of pulses is in order of 6,000 per second. Thus, if the maximum number of graduations to be indicated is 2,500, for example a 25 weight unit scale read to one one-hundredth of a unit, the reading device would be operated so that a single scan would require one-third or slightly more than one-third of a second. The indicator wheel positioning device for the indicators 12 and 36 operates in slightly less than two-tenths of a second maximum. It thus requires approximately one-half second for the reading and indicating of the weight and amount or product of the weight times the fixed factor. If a printed record is desired the time required to make an imprint from type wheels positioned by the indicating wheels 12 and 36 must be added to this time. Ordinarily a printer can be arranged to make an impression in not over a half-second so that a total time of approximately one second is required from the start signal transmitted on the lead 47 until a printed ticket is ready for ejection.

Referring now to FIGURE II which illustrates one form of condition responsive member to which the reading device 1 may be attached, the condition responsive member is a double pendulum load counterbalancing and indicating mechanism of an ordinary weighing scale. Such a mechanism comprises a pair of pendulums 60 and 61 which are supported from a sector guide 62 by means of flexible steel ribbons 63, 64, attached near the top of the sector guide 62 and depending along paralleled sides of such guide and attached at their lower ends to the lower ends of arcuate sectors 65 and 66 of the pendulums 60 and 61 respectively. Load forces from a load receiver transmitted through a steelyard rod 67 are divided and transmitted equally through load tapes 68 and 69 to eccentric arcuate sectors 70 and 71 of the pendulums 60 and 61. Load force applied to the steelyard rod 67 causes the pendulums 60 and 61 to roll upwardly along the vertical sides of the sector guide 62 thereby raising their centers of rotation to which compensating bars 72 are attached. The upward motion of the compensating bars 72 is transmitted to a rack 73 that meshes with a pinion 74 on an indicating shaft which also carries an indicator 75 that cooperates with indicia 76 on the face of a chart 77 to indicate the magnitude of the weight being counterbalanced.

An upwardly extending rod 78 supported from the upper end of the rack 73 or from the compensating bars 72 extends upwardly through the top of the housing enclosing the pendulum mechanism and at its upper end carries a mask 79 which is adapted to expose portions of a stationary graduated chart 80 that is part of the reading device 1. The reading device 1 is illustrated in greater detail in FIGURE IV. As shown in FIGURE II a portion of the reading device is driven by a belt 81 connecting a rotary part 82 of the reading device to a drive motor 83. For convenience the reading device is enclosed in a housing 84 mounted above the housing of the pendulum mechanism.

As indicated in FIGURE III the reading device 1 may also be applied to a spring scale as another example of a condition responsive instrument. As indicated in this figure, loads applied to a steelyard rod 85 are transmitted through a second class lever 86 that is fulcrummed on a fulcrum support 87 and that has its load pivot 88 connected through steelyard rod 89 to a pivot 90 of a first class lever 91. The lever 91 is fulcrummed on a stand 92 and is restrained by a load counterbalancing spring 93 connected between an end of the lever 91 and a fixed frame member 94. The end of the lever 91 is connected through a rod 95, to move a mask 96 of the reading device according to movement of the lever 91, the mask 96 being similar to the mask 79 shown in FIGURE II. The remainder of the reading device is the same as that previously shown. The mask is thus a movable condition responsive member along the path of which extends a stationary chart having graduations that are variably exposed according to the position of such condition responsive member.

The reading equipment may be used with any condition responsive member having a displacement proportional to the quantity being measured. If the proportionality factor is not linear the device may be caused to give linear results by properly spacing the graduations on the stationary chart.

The principal mechanical parts of the reading device 1 are illustrated in FIGURES IV, V, and VI.

Referring first to FIGURE IV, the reading device is photoelectric so as to impose the least restraint possible upon the condition responsive member. The photoelectric system employs moving optical projection elements such that the light path is arranged to sweep over the exposed portion of the stationary graduated chart 80 and generate photoelectric pulses corresponding to the number of exposed graduations. The optical elements comprise a stationary light bulb 101 mounted on a stationary support 102. The bulb 101 extends axially into a hollow end of a movable member in the form of a rotating turret 103 into radial alignment with condensing lenses 104 mounted in a radially directed arm 105 of the rotating turret 103. Light from the bulb after passing through the condensing lenses 104 is reflected by a mirror 106 carried on the radially directed arm 105 toward the stationary graduated chart 80 that is mounted in a framework 107 erected from a base 108 of the reading device. After passing through the stationary graduated chart the light is picked up by a projection lens 109 mounted in a radially extending arm 110 of the turret 103, the lens serving to focus the projected light after a reflection from a stationary mirror 111 onto a masked photocell 112. The arms 105 and 110 of the rotating turret 103 are generally parallel to each other to align the lenses along the optical path so that a maximum amount of light from the light source 101 may be directed into the projection lens 109.

A mask on the front of the photocell 112 has a slit just wide enough to admit a projected image of a chart graduation. Thus as the projection lens 109 sweeps across the stationary chart the projected enlarged images of the chart graduations are swept across the photoelectric cell 112 and each produces its pulse of output current.

For convenience the condensing lenses 104 are preferably mounted in a radially extending bore in the arm 105 and are held spaced therein by a helical compression spring 113. A conventional snap ring may be used to close the opening of the bore and hold the lenses in the bore.

The turret 103 is journaled for rotation on a stationary axle 114 that projects horizontally from a vertical wall 115 of the frame of the device. Ball bearings 116 and 117 are used to ensure that the turret remains accurately in place as it is rotated. It is prevented from moving axially by a sleeve 118 inserted between the outer races of the bearings 116 and 117 and keyed, pinned, or otherwise secured to the bore of the turret 103. The turret 103 is driven from the motor 83 by means of a belt 81 that is trained over a pulley 119 formed on one end of a drum 120 that is journaled on ball bearings 121 and 122 on the axle 114. The drum 120 is held against axial movement by a sleeve 123 interposed between the bearings 121 and 122 and pinned or otherwise secured to the interior of the drum 120. The inner races of the bearings 117 and 122 are urged away from each other by a spring interposed therebetween and not shown in the drawings. Since the inner races of the bearings are loose or capable of axial movement on the axle 114 the spring between the inner races serves to hold the entire assembly in axially fixed positions.

The cylindrical surface of the drum 120 forms the inner working surface of a coil spring clutch 124, one end of which spring is engaged in the turret 103 at a point 125 while the other end of the spring is engaged in a control disk 126 that is loosely journaled on the end of the turret 103 and slightly clear of the drum 120. The disk 126, as may be seen in FIGURE VI, has one outwardly directed tooth 127 adapted to be engaged by a hook 128 which serves to arrest the motion of the disk 126 and thus disengage the clutch. The hook 128 is controlled by a solenoid 129 which is briefly energized to initiate the taking of a reading.

As may be seen in FIGURE V, the rotating turret 103 is held in a position of readiness for a reading during the times between readings by a roller 130 carried on the end of a spring arm 131 and adapted to engage a conforming notch 132 formed in the periphery of the turret 103 in a position such that when the roller is fully engaged in the notch the projection lens 109 is adjacent but not in projecting relation with the first graduations of the graduated chart 80. At the same time, the hook 128 is engaged with the tooth 127 with sufficient force to slightly unwind the coil spring clutch 124 and thus relieve the frictional contact between the drum 120 and the clutch 124. Upon the energization of the solenoid 129 the hook 128 is retracted thus permitting the coil spring clutch 124 to collapse and grip the drum 120 with sufficient force to drive the roller 130 out of its notch and cause the turret 103 to rotate with the drive pulley 119.

As the turret 103 rotates, the projection lens and optical system sweep across the stationary graduated chart 80 and project images of the chart graduations to the photoelectric cell 112 until the field of view of the lens is interrupted by the mask 79 which is positioned by the condition responsive member whose position is to be indicated. After releasing the disk 126 the solenoid 129 is deenergized thus permitting the hook to return to its upper position in readiness to engage the tooth 127 at the completion of the revolution of the turret 103. As the hook engages the tooth and stops the disk 126 the coil clutch 124 slightly unwinds and at the same time the roller 130 urged by the spring 131 enters the notch 132 and thus holds the turret in the selected angular position in readiness for the next scan. While the clutch arrangement as shown is convenient for single scans in response to interrogating or start signals as mentioned previously, the lens system may be allowed to rotate continuously and the reading circuits arranged to respond to individual scans without stopping the lens assembly. For continuous rotation the latch 128 may be locked down or the clutch omitted entirely.

The electronic portions of the improved condition measuring and indication apparatus are illustrated in FIGURES VII, VIII, IX, and X.

Referring to FIGURE VII the electric pulses from the photoelectric cell 112 are passed through a preamplifier included in the reading device 1 and the amplified output signals are transmitted over a lead 135 and through condenser 136 and grid current limiting resistor 137 to a control grid 138 of a pentode amplifier 139. The junction between the condenser 136 and resistor 137 is returned to ground through a grid leak resistor 140. The pentode amplifier 139 is quite conventional in design having a plate resistor 141 and a screen supply lead 142 connected to a B+ lead and having its suppresser and cathode 143 connected together and to the junction between the voltage dividing resistors 144 and 145. The resistor 145 serves in a nature of a cathode bias resistor and is by-passed by a condenser 146. The output of the amplifier 139 is taken from its plate resistor 141, through a condenser 147 to the junction between voltage divider resistors 148 and 149 and thence through a grid current limiting resistor 150 to a first grid 151 of a "Schmidt" trigger circuit.

The "Schmidt" trigger circuit is a two-stage resistance coupled amplifier having cathode resistor feedback from the second stage to the first. The particular circuit comprises a first plate resistor 152 for the first stage and a plate resistor 153 for the second stage. Cathodes 154 and 155 are connected together and tied to ground through a cathode resistor 156. The plate 157 of the first triode section of the circuit is connected through a parallel combination of a resistor 158 and a condenser 159 to a control grid 160 of the second triode section which grid is also tied to ground through a resistor 161. As this circuit is conventionally used the feedback is enough to cause an unstable condition such that the second half of the tube comprising the cathode 155, the grid 160 and the corresponding plate 162 is either conducting at full current or is not conducting at all. The condition is determined by the voltage applied to the grid 151 and the circuit operates in such a manner that as the potential of the grid 151 is slowly raised (the first half being nonconducting) a point is reached at which the cathode 154 begins to draw plate current from the plate 157 thereby reducing the potential on the grid 160. This second tube section immediately reduces current flow to the cathode 155 thereby tending to decrease the current flow through the cathode resistor 156 thus dropping the voltage or potential at the cathode 154. This drop in potential combined with the steady rise in the potential of the grid 151 or by itself is sufficient to increase the current through the plate 157 and cathode 154 still further. This action continues until the current flow from the plate 157 to the cathode 154 is a maximum and the current flow through the second half of the tube, that is the plate 162 and cathode 155, is entirely cut off. At this point the potential of the plate 162 as transmitted through an output lead 163 is at its maximum. As the potential of the grid 151 drops during the decreasing or negative going portion of the pulse transmitted through the amplifier 139 the reverse operation takes place rapidly as the grid 151 passes through the critical potential range. The circuit comprising the two stages thus acts as the equivalent of a toggle switch in that the output current rapidly switches from one condition to the other even though the input voltage on the grid 151 is varied in a continuous manner from one potential level to another.

The voltages appearing on the lead 163 are transmitted through an output terminal 164 which corresponds to the lead 4 of FIGURE I and are used for supplying pulses to the pulse generator 5 or directly to the weight counter as the case may be. If it is desired to gate the signals as may be necessary in some installations and which is suggested in the discussion of FIGURE I the second grid 160 is by-passed to ground through a plate of a triode, not shown in the drawings, which is either conducting or nonconducting depending upon whether the gate shall be open or closed. If the additional triode is nonconducting the pulses are transmitted to the lead 164 without any loss. However, if the triode section is conducting the trigger circuit will not snap from one condition to the other and consequently there will be no output pulses for transmission.

The amplified and shaped pulses appearing on the lead 163 are also transmitted through a resistor 165 and condenser 166 to a diode rectifier 167 that is connected to ground through a condenser 168 and also tied to a first control grid 169 of a second trigger circuit and is connected through a resistor 170 to the B+ voltage supply. The plate side of the diode rectifier 167 is tied to ground through a resistor 171. The rectifier 167 serves, during the time that the pulses are being transmitted, to drive the control grid 169 of the second trigger negative with respect to its static condition sufficiently to cause the trigger circuit to snap to its other condition thereby producing a sharp negative pulse on its output lead 172. This first sharp pulse on the lead 172 may be taken as an indication of the start of a scan or reading cycle of the reading device 1 in the event that such signal is not taken from the actuation of the solenoid 129.

In those cases in which the negative going pulse on the lead 172 is used as an indication of a start of a scan the stationary chart of the reading device is provided with an additional line or graduation spaced from five to ten graduations ahead of those to be counted. This first graduation when scanned, produces the first pulse on the lead 172 which is used as the source of a reset signal to reset all of the counters that are used in the circuit. This voltage pulse which goes negative sharply at the start of a reading also goes positive sharply a short time after the last pulse of a pulse train. This positive going signal thus indicates the end of the scan. The individual components of the second trigger circuit are not individually described since they are similar in function and values to those used in the first trigger circuit.

To reset the counters the initial negative going signal on the lead 172 is transmitted through a coupling condenser 173 to a cathode resistor 174 of a grounded grid amplifier 175. A plate 176 of this amplifier is connected to the B+ lead through a plate resistor 177 and in parallel therewith is a primary winding 178 of an oscillator transformer 179. The negative going pulse thus transmitted to the grounded grid amplifier 175 causes flow of plate current through the primary winding 178 of the transformer thereby inducing a voltage in its secondary winding 180 in a direction tending to drive the attached grid 181 in a positive direction thus causing a current flow through the primary winding 178, plate 182 and cathode 183 of the oscillator section of the amplifier. The current flow through this path increases the voltage generated in the secondary winding 180 in a cumulative manner until the tube saturates and can carry no more current. When this condition is reached there is no voltage generated in the winding 180 and the tube thereupon cuts off the flow of current. The large pulse of current flow through the tube and through its cathode resistor 184 provides a large low impedance pulse signal on a lead 185 that serves as a reset signal for all of the counters.

This signal may be taken at this point to reset the counters or it may be taken from the sequence control 48 as is illustrated in FIGURE I. Since the over-all arrangement is subject to several variations either type of control may be used as best suits the particular requirements. The grid 181 of the oscillating section of the amplifier is ordinarily held at a negative potential sufficient to cut off current flow by means of voltage dividing resistors 186 connected between a ground lead 187 and a negative voltage supply lead 188. One of the resistors 186 is by-passed by a condenser 189 to stabilize its voltage.

The remainder of the circuit shown in FIGURE VII is used in connection with the apparatus illustrated in FIGURE XIX and it is not necessary in the operation of the equipment illustrated generally in FIGURE I. Its specific description will therefore be deferred until FIGURE XIX is considered.

The pulses appearing on the lead 164 of FIGURE VII which correspond to the pulses delivered by the scanning device that reads the scale, are transmitted through lead 164 (FIGURE VIII) to the pulse generator 5 whenever it is necessary to compute the product of the weight times an arbitrary factor. In the event that the product is not required the input pulses received from the lead 164 are transmitted directly to a counter such as by way of lead 6 to the counters 7, 8, 9 and 10 shown in FIGURE I.

The multiplier pulse generator as shown in FIGURE VIII comprises a series of blocking oscillators, the first oscillator in the chain comprising a first half 190 of an amplifier tube having a cathode 191, control grid 192, and plate 193. The cathode 191 is connected to ground through a resistor 194 while the plate 193 is connected to a B+ lead 195 by way of a plate winding or primary winding 196 of an oscillator transformer and a parallel damping resistor 197. The grid 192 is connected to a bias lead 198 by way of a grid winding or secondary winding 199 of the transformer and a resistor 200. The input lead 164 is connected through a coupling condenser 201 to the junction between the grid return resistor 200 and the grid winding 199 of the blocking oscillator transformer. The negative going portion of the pulse signal on the lead 164 has no effect upon the blocking oscillator for the reason that the oscillators are already biased to cut off. However, the positive going portion of the pulse signal raises the grid potential sufficiently to allow conduction of current through the tube. This initial current flow, flowing in the primary winding 196 of a transformer, and through the plate 193 to the cathode 191 generates, by transformer action, a voltage in the secondary 199 in such direction as to increase the grid potential in a positive direction and thereby permit more current flow through the tube. This action accumulates and is limited only by the resistance of the cathode resistor 194 and the resistance of the tube and the primary winding 196. Thus the current increases to a maximum value and then as the tube saturates at that value, there being no further increase in current, there is no voltage generated in the secondary winding 199 and consequently the grid potential of the grid 192 drops to zero or to the bias voltage supply potential thereby cutting off the flow of current through the tube 190 thus resulting in a sharp positive rise in voltage at the plate 193 and drop in potential across the cathode resistor 194.

The voltage pulse appearing at the plate 193 of the tube 190 which first goes negative and then positive is transmitted through a coupling condenser 202 to a grid winding 203 of the next blocking oscillator transformer 204. The grid winding 203 is connected directly to a grid 205 of the next blocking oscillator tube so as to control the current flow through this tube 206. The second oscillator is similar in circuit to the first and has its cathode 207 connected directly to the cathode 191 and also to the output lead 13. Since the oscillators are tripped or caused to generate a cycle of oscillation by a positive going signal it follows that the negative going signal appearing at the first part of the cycle of the first oscillator 190 has no effect on the second oscillator except to charge the condenser 202 through its return resistor 208. However, the positive going or trailing edge of the voltage pulse at the plate 193 going in a positive direction drives the grid 205 positive so as to start the cycle of oscillation in the second tube 206.

The current flow through the tube half 190 causes a sharp positive going pulse across the cathode resistor 194. Likewise, the cycle of oscillation in the tube 206 causes a similar voltage pulse across the cathode resistor 194 so that the lead 13 thus is subjected to two voltage pulses for each pulse applied to the input 164. The damping resistor 197 is included to control the overshoot in voltage following the sharp cut off of current flow through the tube in each of the blocking oscillators. The remaining oscillators comprising tube sections 210, 211, 212, 213, 214, 215, 216, and 217 are connected in similar circuits and each is tripped or energized by the trailing portion or end portion of the cycle of oscillation of the preceding oscillator tube. The tube sections 210 to 213 inclusive share a common cathode resistor 218 while the tube sections 214 and 215 share a cathode resistor 219. Finally the last two tube sections 216 and 217 have individual cathode resistors 220 and 221. Suitable values for the circuit elements are 1,000 micro-microfarads for each of the condensers, 5,000 ohms for the grid return resistor 200 of the first oscillator stage and 1,000 ohms each for the grid return resistors of the remaining oscillator stages and 500 ohms for each of the cathode resistors. The transformers are preferably one to one ratio close coupled coils having suitable inductances to give a cycle of oscillation occupying about ten microseconds of time. The grid bias supplied on the lead 198 is sufficient to bias each of the tubes to cut off so that in the absence of any input pulses the circuit does not draw any current. The lead 13 is connected to the cathode resistor 194 and thus receives two positive voltage pulses one from each of the oscillator tube sections 190 and 206 thereby providing two pulses for each input pulse at the terminal 164. The cathode resistor 218, to which the lead 14 is connected, is common to the cathodes of the tube sections 210, 211, 212 and 213 and thus has four voltage impulses for each signal impulse at the input terminal 164. Likewise, the cathode resistor 219 serves the sections 214 and 215 thus receiving two voltage pulses per cycle or input signal. The ninth section 216 has its sole cathode resistor 220 and thus provides a single voltage pulse on the output lead 16 for each signal received on the input 164.

The negative going portion of the voltage pulse appearing across the last cathode resistor 220 is utilized in the carry storage stage 38 operating between the counter decades 29 and 30. This circuit utilizes the negative going portion of the pulse or trailing portion and thus is delayed in time from the initial positive going pulse that is utilized in the actual multiplying operation. Likewise, the signal used to clear the second carry storage stage is taken from the cathode of the final oscillator stage 217. Thus by utilizing the positive going portion of each oscillator voltage pulse for the multiplying purpose and using the trailing portion of each of the last two pulses which is generally coincident in time with the positive going portion of the next pulse one obtains effectively eleven evenly spaced pulses out of ten blocking oscillator circuits. The extra pulses are obtained by using both the positive and negative going portions appearing across the cathode resistor 220 of the ninth oscillator.

As was mentioned in connection with FIGURE I the output pulses of the pulse generator 5, the series of blocking oscillators, are transmitted through the leads 13, 14, 15, and 16 to the diode matrix 18 where these four leads are connected to nine leads in such a manner that a first lead shows one pulse for each signal on the input terminal 164 corresponding to the lead 4 while the second lead shows two pulses per signal, a third three, etc. This diode matrix appears in the lower left hand corner of FIGURE VIII and is composed of a number of diodes for connecting the leads 13, 14, 15, and 16 to the respective ones of nine leads represented by the nine horizontal lines in the bottom half of the FIGURE.

Lead 16 which carries one pulse for each pulse going through the pulse generator is connected directly to the first of the horizontal lines, the number 1 line in a numerical sequence. Lead 15 is likewise connected directly to the second line marked 2 since it supplies two pulses per cycle. Likewise, lead 14 which carries four pulses per cycle or per input pulse is connected directly to the number 4 line. Number 3 line is fed with two pulses per cycle by way of diode 222 connected to the lead 15 and with one pulse per cycle through diode 223 connected to the lead 16. Since the pulses on the various ones on the leads 13, 14, 15, and 16 are never coincident in time the pulses may be added by merely leading them to the respective lines through the diode rectifiers, the diodes being used to prevent any feedback from one source to another. Thus number 5 line, to carry five pulses per cycle, is fed from the number 4 line by way of diode 224 and is also connected to the number 1 line through diode 225. Thus this line receives four pulses through the diode 224 and one through the diode 225 making the five pulses per cycle of operation. Likewise, number 6 line receives four pulses per cycle from line 14 by way of diode 226 and also receives two pulses per cycle by way of diode 227. The six pulses appearing on line 6 are also transmitted to line 7 through diode 228 and in addition one additional pulse is supplied through diode 229 from lead 16 thus making a total of seven pulses per cycle.

Eight pulses for number 8 line are obtained by way of six pulses from number 6 line through diode 230 and two additional pulses from lead 13 by way of diode 231. The diode 231 is necessary to prevent feedback from the leads 14 and 15 to lead 13. For this reason the lead 13 cannot be connected directly into that portion of line 8 which feeds the selector switches but rather must be isolated as shown.

The remaining line, number 9, receives nine pulses per cycle, eight of these from line number 8 by way of diode 232 and the additional one through diode 233. This combination of diodes or semi-conductors makes it possible to combine the various time separated pulses appearing on leads 13, 14, 15, and 16 into combinations appearing on the lines 1 to 9 inclusive wherein each line carries a number of pulses per cycle corresponding to its position in the group, thus number 1 line carries one pulse per cycle, number 2 two pulses per cycle, etc.

These lines are connected through the cable 19 to the factor setting device which comprises a plurality of selector switches 234, 235, and 236. The selector switches one for each place in the factor are provided with common arms or switch arms which in turn are connected to the output leads 21, 22, and 23 which lead to the amount counter. The output impedance of the pulse generator is so low that a number of selector switches greater than that shown may be employed without interaction between circuits and without overloading the generator. The worst condition of overload occurs when all of the selector switches are connected to the same line. However, even in this situation, the input impedance to the following amplifiers is high enough so that there is no loss of signal in the circuits.

Referring now to FIGURE IX, in connection with FIGURE I, the voltage pulses from the pulse generator 5, which was illustrated in detail in FIGURE VIII, are transmitted through the matrix 18 and selector switches 234, 235, and 236, are transmitted to the combining amplifiers 25, 26, and 27. These amplifiers as well as the carry pulse storage circuits are illustrated in FIGURE IX. The pulses selected by the selector switch 234, which may be the units place in the factor, are transmitted through the lead 21 to the combining amplifier 25. This circuit includes a coupling condenser 237, a grid current limiting resistor 238 and a grid bias leak resistor 239. The lead 21 from the selector switch 234 is tied to ground through a loading resistor 240 to make sure that the grid of the amplifier 25 never sees a high impedance and to maintain uniformity of loading on the matrix 18 insofar as possible. Without the resistor 240 the matrix, acting as a rectifier, would drive the lead 21 positive thus storing a charge on the condenser 237 and biasing the diodes to prevent a further application of impulses to the amplifier. However, the loading resistor 240 provides a discharge path so that all of the pulses are transmitted to the amplifier 25. The grid leak resistor 239 is by-passed with a crystal diode 241 to prevent the grid bias from going negative because of grid current flow in the amplifier tube. The grid leak resistor and diode are returned to a grid bias lead 242 which is maintained at approximately eight volts negative by means of resistors 243 and 244 providing a volt divider from a sixteen volt negative grid bias supply used with the pulse generator 5. The cathode of the amplifier is connected to the grounded lead while its screen 245 is connected to a positive 150 volt supply line 246. The amplifier tube 25 also has a plate 247 that is connected through a plate resistor 248 to the positive voltage supply lead 246. The positive voltage pulses received from the selector switch are amplified through the amplifier 25 and appear as negative pulses on its output lead 249 that serves as the input to the first decade 29 of the amount counter 28. The amplitude of signal supplied to the output lead 249 is limited in the positive direction by plate current cutoff in the amplifier 25 and is limited in the negative direction by current flow through a diode 250 connected to voltage divider resistors 251 and 252, the second resistor 252 being by-passed by a condenser 253. The resistors 251 and 252 are preferably in the ratio of two to three so that the voltage drop across the resistor 251 is about 60 volts. This controls the amplitude of the signal on the lead 249 to secure reliable performance of the electronic counters 29, 30, 31, etc.

As the decade 29 (FIGURE I) fills it transmits a carry pulse by way of lead 37 to the carry storage circuit 38, the signal being transmitted through coupling condensers 254 and 255 to a first control grid 256 which is normally at a positive potential to permit current flow from the supply lead 246 through a plate resistor 257, plate 258, past the control grid 256, and through cathode 259 and cathode resistor 260 connected to the grounded lead. The cathode resistor 260 is by-passed with a condenser 261. This carry storage circuit 38 is similar to an ordinary binary electronic counter stage in that it comprises a pair of triodes one having the cathode 259, the other having a cathode 262, a control grid 263 and plate 264. As is customary in such circuits the plates and grids are cross connected by resistors by-passed with condensers and in this case the plate 258 is connected to the grid 263 through a resistor 265 and condenser 266 while the plate 264 is connected through a resistor 267 and condenser 268 to the grid 256. The grids are returned to ground through grid leak resistors 269 and 270 the latter also including the reset circuit which is tied to ground except for the interjection of the voltage to reset the trigger or storage stage to a certain starting condition. Likewise, the junction between the input condenser 254 and 255 is tied to ground through a parallel combination of a resistor 271 and diode 272.

In normal operation of this circuit, at the start of a reading operation and before the transmission of pulses to the counting circuits, a positive pulse on the reset lead 52 is transmitted through resistor 270 to drive the grid 256 positive, if it is not already in that condition, so that the right half of the tube draws current through the plate resistor 257 and plate 258. The drop in potential at the plate 258 is communicated through the coupling resistor 265 to the second control grid 263 so that current is cut off from the plate 264. Thus the plate 264 and the output line 273 connected thereto is at its most positive potential as is determined solely by the plate resistor 274 and the coupling resistor 267. This is the normal condition for the circuit.

As the counter decade 29 fills and supplies the carry pulse through the lead 37 such pulse, being in the negative going direction, drives the grid 256 negative thus cutting off the flow of current in the right half of the tube thereby driving the plate 258 positive so as to communicate a positive voltage to the grid 263 causing the left half of the tube to become conducting. As this side of the tube becomes conducting the drop in voltage caused by plate current flow through the resistor 274 drives the plate 264 and lead 41 negative or in a negative direction thereby maintaining current cutoff in the right hand section of the tube. This drop in voltage also through the small coupling condenser 275 connected to lead 41 drives the grid of the next combining amplifier 26 negative which is without effect at this time because the amplifier is already biased to cut off. Once the carry storage circuit 38 is conditioned by the carry pulse received on the lead 37 it remains in such condition until it is either reset or until a pulse is received from the pulse generator 5 through lead 44 connected through coupling condensers 276 and 277 to the grid 263. The junction between the condensers 276 and 277 is connected to ground through a parallel combination of a resistor 278 and diode 279. The diode is polarized to shunt current to ground when the lead 44 tries to go positive thus charging the condenser 276 so that the negative trailing portion or trailing side of the positive pulse drives the grid 263 negative. As the grid 263 is driven negative it cuts off the flow of current to plate 264 thus producing a positive going voltage at the plate 264 which is transmitted through the lead 41 and condenser 275 to the control grid of the second combining amplifier 26. This clearing pulse from the generator 5 switches the carry storage circuit 38 to its original condition and through the amplifier 26 transmits the stored carry pulse over lead 280 to the second counter decade 30.

The second combining amplifier is similar to the first except for the addition of pulses from the carry storage 38 and its output is taken through the output lead 280 and fed into the counter decade 30 of the amount counter 23. When this second counter fills, i.e., reaches the limit of its capacity and start over, it transmits a voltage impulse through lead 42 to the second storage circuit 43. This circuit is similar to the first and when it is reset by the negative going portion or trailing edge of the pulse received from the pulse generator 5 on line 39 it transmits a positive signal by way of lead 46 and coupling condenser 281 to the control grid 282 of the next combining amplifier 27. The positive pulse applied to this control grid causes a corresponding negative pulse to appear on its output lead 283 which is transmitted directly to the third counter decade 31.

While the combining or mixing amplifiers 26 and 27 have been shown with capacity and resistance coupling to their control grids they may also be operated with a diode connected between a control grid and the input lead from the multiplier through the selector switches with the control grid itself by-passed to the negative bias lead through a resistor. The use of a rectifier in this position acts as a gating circuit so as not to impose any load on the amplifier tending to drive this particular stage. Thus the diodes would tend to unload the carry storage stages and permit somewhat faster operation of the stages.

These particular components thus provide for transmitting the multiplier pulses simultaneously to several decades of the amount counter and preventing any interference between the counter decades by storing the carry pulses during the transmission of multiplier pulses and then transmitting, after such series of pulses, the carry pulses to the following decades of the counter. This clearing of the carry storage circuits to transmit any stored pulses also occurs sequentially or at timed interval steps so that there is no possibility at any time of simultaneous entrance of pulses into any of the electronic counter decades.

A single stage of one of the binary counters used in each of the decades 7 to 10 inclusive or 29 to 34 inclusive is illustrated in FIGURE X. It is to be understood that each decade employs four such stages. These stages are individually commonly known as flip-flop circuits and each comprises, as is well known, a common plate resistor 285, individual plate resistors 286 and 287, plate to grid resistors 288 and 289 and grid to ground resistors 290 and 291. In addition, the cathodes 292 and 293 are tied together and connected to ground through a common cathode resistor 294 which is by-passed with a condenser 295. Also the plate to grid resistors 288 and 289 are by-passed with condensers 296 and 297 respectively. Grid 298 cooperating with cathode 292 is connected to the junction between the resistors 288 and 290 while the plate 299 cooperating with the cathode 292 and grid 298 is connected between the plate and grid resistors 287 and 289. Likewise, the grid cooperating with cathode 293 is tied to the junction between resistors 289 and 291 while a plate 301 cooperating with a grid 300 is connected to the junction between the resistors 286 and 288 respectively. Input pulses in a negative direction are transmitted to the counter circuit through an input condenser 302 and output pulses from the counter stage are transmitted through an output condenser 303 which may be the input condenser for the next stage. The input condenser is connected to the junction between the common plate resistor 285 and the separate plate resistors 286 and 287 so that the negative voltage pulse supplied thereto is applied equally to the plates 299 and 301. The output voltage pulse is taken from the plate 299 that is connected to the junction between the plate resistor 287 and plate to grid resistor 289.

With the usually accepted values for the plate resistors, plate to grid and grid to ground resistors, the circuit is bi-stable, i.e. one side or the other of the tube will conduct current while the other side will be cut off. This condition of current flow may be reversed by the application of a sharp negative pulse through the condenser 302 to the plate resistors. This may be explained as follows: When the grid 300 is positive with respect to its cathode 293, so that current flows through the plate resistor 286, the potential of the grid 298 is driven sufficiently negative so that tube is cut off and there is a relatively high voltage appearing at the junction between the resistors 287 and 289. This means a relatively high voltage charge on the condenser 297 and a relatively smaller charge on the condenser 296. The negative voltage impulse supplied to the junction between the plate resistors drives both plates negative and at the same time drives the grids negative. As the plates and grids are driven negative, current flow through the plate 301 and cathode 293 is, of course, cut off and the resulting tendency for the plate 301 to go positive due to the reduction in current flow through the resistor 286 tends to drive the grid 298 positive with respect to its cathode 292 thereby causing the left half of the tube to conduct current. Thus with the disappearance of the negative pulse on the plate resistors the circuit remains at the stable state with the cathode 292 and plate 299 drawing current. This results in a sharp negative going step of voltage at the plate 299 which is transmitted through the condenser 303 to the next stage. The time constant of the condensers 302, 303, or the equivalent condensers and the common plate resistors 285 is short enough so that the step of voltage applied at the input condenser appears as a sharp pulse of voltage at the output. The following pulse of voltage applied through the input condenser again reverses the condition of current conduction in the tube so that the complete cycle is completed for two input pulses this resulting in one output pulse. The conduction condition of the tube or stage is transmitted to readout devices by way of resistors 304 and 305 connected to output lines 306 and 307 which lead to the respective indicating devices. These may be either combinations of neon lamps or they may be commutator or other switch arrangements designed to scan the connections of a decade, a group of four such stages, and determine from the voltage condition the count represented in such decade.

In order that a decade may read and repeat in cycles of ten instead of sixteen, sixteen being the normal repetition cycle for a four-stage binary counter, feedback connections are taken from the plate of the third stage to a control grid of the second stage and from a plate of the fourth stage to a control grid on the third stage as is well know, so as to artifically inject an equivalent of six additional impulses thereby advancing the count so that the complete cycle is completed in ten input pulses rather than in sixteen.

Electro-mechanical means a form of readout for displaying an indication corresponding to the count represented by the counter decades is illustrated schematically in FIGURES XII, XIII, XIV, and XV and the actual mechanism is shown in FIGURE XVI. As indicated in FIGURE XII the several stages of a decade are indicated by the rectangles numbered 1, 2, 2', and 4 and have their output leads 306, 307 connected respectively to the contacts schematically illustrated as 308, 309, 310, 311, 312, 313, 314, and 315 there being eight contacts corresponding to one decade. Movable contacts oscillatable between these contacts are illustrated by switch leaves 316, 317, 318, and 319. These are merely symbolic representation of an arrangement of a commutator or stepping switch or other arrangement which is set up to close the circuits in various combinations in sequence according to various voltage combinations obtainable in the counter decade. The common connection to the switch leaves 316 to 319 is taken to a grid 320 of an amplifier tube having a plate 321 and cathode 322. The plate circuit includes a relay coil or solenoid 323 that is adapted to control a latch 324 that cooperates with a frictionally driven star wheel 325. The star wheel is carried on an arm 326 journaled on the axis of an indicating drum 327 that is geared to the star wheel assembly 325 at two to one ratio. The star wheel assembly 325 includes a smooth portion to engage a rubber tired drive wheel 328 when it is desired to take a reading.

In operation, when it is desired to take the reading after the counters have reached their final count position the latch 324 is withdrawn to allow the arm 326 to swing downwardly to engage the star wheel assembly 325 with the clockwise turning drive wheel 328. This engages the star wheel assembly and drives it and the positively connected indicator drum 327 at a fairly rapid rate. The indicator drum 327 is provided with a commutator as illustrated in FIGURE XIII or with some cam arrangement for operating switches such as the switch leaves 316, 317, 318, and 319 so as to connect the circuits from the counter stages to the amplifier grid 320 according to the position of the indicator drum 327. When the selected voltage combination is obtained at which each of the switch leaves 316 to 319 is engaged with a then positive lead from the counter, the tube conducts and the solenoid 323 actuates a latch 324 to catch the approaching tooth of the star wheel 325. The rotating inertia of the indicator drum 327 and any print wheels such as a print wheel 329 drivingly connected therewith tends to cause the star wheel to continue rotating in a counterclockwise direction thus throwing it, when caught by the latch 324, out of engagement with the drive wheel 328 and up against a stop, not shown, that arrests the motion of the indicating wheel and print wheels. Thus the rotating inertia of the indicating system is employed to disengage the drive so that very little power is required from the electrical solenoid to effect the stopping of the relatively heavy indicating wheels.

A suitable commutator for use in the indicator drum 327 is illustrated in FIGURE XIII. This commutator, there being one mounted in each of the indicating drums 327, comprises nine rings each of which is engaged by a separate brush indicated by the small circles. Eight of the brushes are connected to the leads coming from the four stages of the corresponding decade of the counter, while the ninth lead is the common connection that leads to the grid 320 of the amplifier tube. A suitable arrangement of conducting and nonconducting circuits is selected as shown for the commutator so that all portions of the commutator are connected together without the necessity of any bridging leads on the back side of the commutator disk.

FIGURE XIV illustrates the code or condition of conduction that exists in the four stages of a decade of a binary counter that is operated with the feedback system mentioned for converting from the scale of 16 binary counters to a decade scale. As illustrated in the table of FIGURE XIV the decimal number zero is indicated when all the left hand portions of the tubes are nonconducting and all the right hand portions are conducting. The relative conditions of conduction or nonconduction on the output leads from each stage of a binary counter is followed through on the chart of FIGURE XIV. Thus, the number 1 which occurs after one pulse in the first stage causes a reversal of conduction in the first stage as indicated by the left side carrying current and the right side non-conducting and the remaining three stages are not affected. The second pulse returns the first stage to its original condition and it in turn transmits a signal to the second stage bringing it to its second condition with the left side conducting and the right side not. The third pulse returns the first stage to its conducting condition thus leaving stages 1 and 2 conducting to represent numeral 3. The fourth pulse in normal operation returns the first stage to its nonconducting condition whereupon it in turn drives the second stage to its nonconducting condition and it in turn drives the third stage to its conducting condition as indicated by the left side drawing current. However, the feed back connection from the third to the second stage at this point transmits a signal back to the second stage to reset it in condition with its left side conducting. Thus the fourth pulse is indicated by the conduction in the second and third stages. The fifth pulse merely transfers the first stage again while the sixth pulse transfers the first to its nonconducting state. It in turn transfers the second stage to its nonconducting state and it in turn transfers the third stage to its nonconducting condition whereupon that stage transfers the fourth stage to its conducting condition but the puse transmitted back from the fourth to the third resets it in its conducting condition so that the numeral six is indicated by conduction in the third and fourth stages. The seventh pulse merely transfers the first stage again while the eighth pulse transfers the first and second stages, the first to its nonconducting state and the second to its conducting state leaving the third and fourth as is. The ninth pulse returns the first stage to its conducting condition thereby leaving all four stages in conducting condition. The next pulse, or tenth pulse, is transmitted through the entire chain to restore all of the stages to the left side nonconducting or right side conducting condition indicating the numeral 0. The transfer of the fourth stage gives the carry signal for the next decade.

The commutator illustrated in FIGURE XIII has its conducting portions arranged relative to the brushes so that the various voltage combinations represented by the table in FIGURE XIV may be obtained at the ten different points around the circumference of the commutator. In this arrangement one and only one of the ten segments will result in a condition where all of the brushes contacting conducting portions of the commutator are connected to positive voltages. At this time, the grid 320 is driven sufficiently positive to actuate the latch. At other times the tube may be biased off by varying amounts depending upon the particular combination.

The order of the segments on the commutator is selected so that in going from one segment to the next two brushes only transfer from conducting to nonconducting segments or vice versa. This arrangement provides that, as the commutator rotates, there will never be a voltage change going from one segment to the next which is greater than one step or one-fourth of the total range of voltages delivered to the grid of the tube. This avoids the possibility of erroneous operation from large transient voltages resulting from large voltage changes on the lead to the tube. As shown, the commutator is arranged so that the innermost circle is continuous and is connected to the common brush which in turn is connected to the grid of the tube controlling the solenoid. The next brush in order is connected to the right side of the first counter stage, i.e. the contact 309, the next ring, the third, is connected to the right side of the second counter stage, the fourth ring to the left side of the first, i.e. the contact 308, the fifth ring is connected to the left side of the second stage, i.e. the contact 310, the next ring, the sixth ring, is connected to the right side of the third counter stage, the seventh ring is connected to the right side of the fourth counter stage, i.e. the contact 315, while the eighth ring is connected to the left side of the third counter stage and the ninth ring is connected to the left side of the fourth counter stage.

The voltages appearing at the grid of the control tube as the commutator rotates for three different counter settings is indicated in FIGURE XV. Thus in the upper portion of the figure with the counter set at zero the voltage is a maximum when the indicating drum is in the zero position then drops staircasewise in four successive steps as the commutator turns from the zero to the number nine position, then it rises for two steps to the number six position, then drops to the one position then rises staircasewise back to the zero or maximum voltage when the zero is again reached at the end of a complete revolution. Thus it will be seen that at only one point in the revolution of the commutator does the voltage exceed the bias voltage at which the tube is controlled so that current flows only for one-tenth of the commutator revolution. Likewise, when the counter is set at six the maximum voltage condition is reached when the commutator is in the number six position. Likewise, for the other possible counter combinations which if traced out the maximum voltage will be seen to occur at the respective numbers and nowhere else. Thus as the commutator is driven through the star wheel drive, as shown in FIGURE XII, and the voltage condition is reached at which the tube conducts the latch engages the star wheel and stops the indicator drum in correct position to indicate the count then standing in the electronic counter. There is one such system for each of the decades whose counts are to be indicated. Thus in the arrangement shown in FIGURE I there are eight such indicating drums, commutators, star wheels, and controlling latches.

A suitable mechanical structure is illustrated in FIGURE XVI. As shown therein the indicator drum 327 is carried on an axle 330 that extends throughout the complete assembly of indicating drums. Each of the arms 326 which is generally triangular in shape has an upwardly extending portion on which the star wheel assembly 325 is journaled. This is accomplished by means of a stud extending laterally from the end of the arm 326 and journaling the star wheel assembly. A control rod or control shaft 331 extends throughout the entire assembly generally parallel to the axle 330 and on it is journaled a yoke 332 that may be oscillated through a small angle to control the action of the moving parts of the assembly.

When it is desired to cause the indicating drums 327 to move to positions corresponding to the count then stored in the electronic counters the control rod 331 and yoke 332 are rotated clockwise as seen in FIGURE XVI until the yoke engages the finger of a latch arm 333 and a finger 334 of the arm 326. The resulting rotation of the latch arm 333 cams the latch bar 324 out of engagement with the star wheel and at the same time the yoke 332, by engaging the finger 334, drives the arm 326 downwardly to engage the star wheel assembly 325 with the drive wheel 328 which is turning counterclockwise in FIGURE XVI. The drive wheel 328 drives the star wheel assembly and it in turn drives indicating drum 327 in a counterclockwise direction so as to carry the commutator mounted on its inside surface past a series of brushes mounted on the arm 326 and connected to the series of leads brought out through the side of the arm. When the drum has turned to a position in which the commutator indicates correspondence between the counter voltages and the indicator drum position the solenoid 323 is energized to draw its latch 324 into engagement with an oncoming tooth of the star wheel assembly 325. This engagement, by the inertia of the rotating parts, drives the star wheel assembly upwardly toward the left with the following tooth just clearing a stop bar 335 which prevents any rebound of the indicating drum 327. As the arm 326 moves upwardly a catch 336 moves under a projecting tab of the arm 326 so as to lock the arm in an upward position. This prevents any further change in indication of this particular type wheel. After all of the wheels have thus been locked up the yoke 332 which had been restrained by those latches 333 not yet released by movement of their corresponding arms 326 is finally allowed to move to its uppermost position thus indicating that all of the type wheels have been satisfactorily positioned. This final movement of the yoke 332 may if desired be employed to initiate a cycle of operation of the printing mechanism.

A simplified schematic illustration of circuits suitable for operating a sequence control for the improved indicating, multiplying and recording mechanism is illustrated in FIGURES XVII and XVIII. As illustrated in FIGURE XVII a pair of alternating current supply leads 340 and 341 are adapted to furnish power to a filament transformer 342 by way of filament control switch 343. A plate voltage power supply 344 is energized from the leads 340 and 341 through a power switch 345. The switch 345 also controls the flow of current to a lead 346 that feeds a motor 347 adapted to drive the scanning mechanism at the scale, a motor 348 that drives the printing mechanism whenever it is clutched thereto by means of solenoids to be described and a rectifier 349 that supplies direct current to leads 350 and 351 supplying power to the solenoids used in the control circuit. Two solenoids SOL–1 and SOL–2 are ordinarily employed in the control, these being of the rotary type, the solenoid SOL–1 being adapted or used to operate the yoke 332 shown in FIGURE XVI which yoke is used to trip the latches and engage the star wheel assemblies with the drive rollers 328. The solenoid carries two switches, one an ordinary, normally open single-pole single-throw switch and the other a single-pole double-throw switch. The single-pole single-throw switch 354 appears in line J of FIGURE XVIII while the single-pole double-throw switch 355 appears in lines N and O of FIGURE XVIII. The solenoid SOL–1 is arranged to close its switch 354 when it is moved to the position at which all of the star wheels are engaged with the drive roller. At this same time it operates its single-pole double-throw switch 355 to its operated condition and this switch is not returned to its original condition until the solenoid SOL–1 and the yoke 332 reaches its fully retracted position as the last of the indicator drums to arrive in indicating position is actually locked in such position. Thus the reclosure of the switch 355 is a signal that the counter indications have been correctly reproduced by the indicating mechanism. The second solenoid SOL–2 is employed to initiate the printing cycle and it has one normally closed contact that is open during the duration of the printing cycle. This contact 356 appears in the lead from the D.C. supply lead 351 to the coil of the solenoid SOL–1 as shown in FIGURE XVII, line A.

Three relays R1, R2, and R3 are employed in the control as illustrated in FIGURE XVIII. The several relays are required in order that the over-all operation be interlocked to prevent false operation or false results. The particular danger to be guarded against is partial readout, i.e., an incomplete scan of the weighing scale or other condition responsive instrument. For example, if a reset operation should occur during the middle of a scan then only the remaining portion of such scan would be indicated. This would lead to a result which would be much smaller than the true indication of the instrument. To guard against this the circuit is arranged so that operation of the start button does not by itself initiate a reading operation. It can start the clutched type of scanner in which the actual scanning mechanism is clutched and allowed to make a single revolution for each reading. In other types in which no clutch is employed but in which the scanner operates continuously the start of the reading operation must be synchronized with the scanner. This is accomplished through the relay system shown in FIGURE XVIII. Assuming that the scanner is running continuously it is arranged to either mechanically by switches operated by the scanner or electronically as indicated in FIGURE VII provide certain signals. One of these, a start of scan signal occurs a short time previous to or at the start of the actual scanning of the chart. This is indicated as the reset signal in FIGURE XI and is operated by scanner switch 357 appearing in line Q of FIGURE XVIII.

In the sequence control, the circuit shown in FIGURE XVIII, the reading operation is started by pressing a start button 358 in line E so that current may flow from a positive line 359 through a current limiting resistor 360, coil of the relay R1 shown in line E thence through normally closed contacts R2 of the second relay and the now closed push button 358 to a return line 361. The relay R1 thereupon closes its contacts R1 in line F so as to complete a holding circuit or sealing circuit to hold the relay R1 energized when the push button is released.

Referring also to FIGURE XI, the operation or the sealing in of the R1 relay as represented in time in the third line of the diagram may occur at any time in relation to the scanning cycle of a continuously operating scanner. Such a scanning is illustrated in the first line of FIGURE XI in which a start of a scan is indicated by the ascending steps 362 while the end of scan are represented by the descending steps 363. The time of operation of the start button and hence the energization of the relay R1 is represented by the ascending step 364.

After the relay R1 is sealed in and has closed its contacts R1 in line A of FIGURE XVII the next time the scanner closes its contacts SS–1B, shown in line A, at a time corresponding to the end of a maximum scan, second line of FIGURE XI, the circuit is completed to energize the solenoid SOL–1. This solenoid SOL–1 is only energized briefly while the scanning switch is closed and it serves to release the star wheels of the indicating device to place them in driving connection with the drive roll and at the same time by closing its contacts 354 in line J completes a circuit from a supply line 359 through resistor 365, the operating coil of relay R2, and the now closed contacts 354. The solenoid contacts 354 in line J remain closed until each of the indicating drums 327 has reached its final indicating position and the trip yoke 332 has returned to its final position. Therefore, the R2 relay is held in at least that long as shown in the sixth line of FIGURE XI. The R2 relay is also sealed in through contacts 366 of a printer solenoid SOL–2 which remain closed until the end of a printing operation and through its own contacts R2 in line K which are in series with another set of scanner contacts 367 arranged to open briefly a short time prior to the start of a scan.

The R2 relay has several sets of contacts, one set being shown in line P of FIGURE XVIII which are connected to one of the grids of the amplifier and shaper circuit of FIGURE VII so as to paralyze such circuits as long as these contacts are closed. Another set of contacts of the R2 relay appearing in line R are arranged to shunt and thus render ineffective scanner reset contacts 357 operating a reset circuit which would otherwise reset the counters during a reading out cycle of operation. Ordinarily the counters are reset periodically at the end of each scan by operation of the scanner contacts 357 in line Q. This is the reset signal that appears in the bottom line of FIGURE XI.

As soon as the indicating wheels have all reached their final position as indicated by the full release of the solenoid Sol–1 it recloses its contacts 355 in line N so as to energize the relay R3 by current flow from the line 359 through the coil of the relay R3 in line N and then through a fairly large condenser 368 of about 20 microfarads and then through the now reclosed contacts 355 of the first solenoid. The charging current for the condenser 368 operates the relay R3 momentarily but long enough to close its contacts R3 in line C and thus momentarily energize solenoid Sol–2. The momentary operation of the R3 relay also opens its contacts R3 in line F to break the seal on the R1 relay thus restoring it to its non-energized condition. Upon the completion of the printing cycle as indicated by the opening of the solenoid Sol–2 contacts 366 in line M, relay R2 may be deenergized. Whether or not the relay is actually deenergized depends upon the condition of the scanner contacts 367 in line K. These contacts also must open so as to break the sealing circuit in line K leading to the relay coil of relay R2. Relay R2 is thus held energized until the complete reading and printing cycle is complete thus preventing false operation which might occur by inadvertent pushing of the start button 358 during the reading cycle.

Since it is desired to have very rapid response of each of the relays R1 and R2 their operating coils are fed through resistors 360 or 365 which are connected to the return lead 361 through 20 mfd. condensers. When the relay is deenergized the condenser charges to full line voltage. Then when the relay coil circuit is closed the full voltage is applied momentarily. The voltage and coil current then drop to values determined by the resistance of the operating coils and series resistor 360 or 365. To protect the contacts in circuit with the relay coils and solenoid coils and the insulation of the coils from the high voltage surge of the inductive circuit, the coils are each by-passed by a crystal rectifier that provides a low impedance discharge circuit for the energy stored in the relay and solenoid coils.

This particular circuit thus provides the possibility with a continuously operating scanner of synchronizing the readout operation in which the count stored in the electronic counters at the end of a scan is held by paralyzing the reset circuit and such count is transferred to the mechanical indicating mechanism and at the completion of such transfer is then recorded by taking an impression of type wheels positioned by the mechanically indicating mechanism. The system is all interlocked so that each step must be completed before another step dependent upon the preceding step may take place.

The circuits shown in the lower part of FIGURE VII also provided electronic signals corresponding to the start and end of a scan and such signals could by well known means be substituted for the scanner operated switches illustrated in FIGURES XVII and XVIII.

Various other forms of indicating or display devices may be employed with the electronic counters indicated in FIGURE I. Thus while the indication display device described provides a mechanical indication which may include type wheels, other applications of the mechanism may only require visual indication. Or in some cases it may be desirable to operate adding machines, electric typewriters or similar equipment such as card punching equipment from the electronic counters.

One form of circuit suitable for providing means for storing and indicating the count accumulated in the electronic counting means according to the last scan or last reading is illustrated in FIGURE XIX. Two decades 375 and 376 selected at random from a multi-decade counter are shown for illustration only and do not necessarily represent any particular orders in the counter. Each of the decades has four output leads, such as leads 377, 378, 379, and 380 from the decade 376. These leads are preferably tied to the left hand plates of each of the four stages of the decade. Each of these leads is connected through a high resistance, in the order of one megohm, such as resistors 381, 382, 383, and 384, to control grids of a set of dual grid thyratrons 385 to 388 inclusive. Cathodes 389 of the thyratrons are tied to ground as indicated by the grounded symbols. The control grids are also tied to a negative bias lead 390 through resistors 391 to 394 inclusive. The thyratrons 385 to 388 are fed through a plate voltage supply lead 395 and each includes a relay coil 396 by-passed by a crystal rectifier 397 in its plate circuit. Normally the lead 390 is biased sufficiently negative that none of the thyrathrons can conduct current even though plate voltage is applied to them.

At the end of a scan when a signal is received that the scan is complete the lead 390 is pulsed in a positive direction sufficiently to reduce the bias on those thyratrons whose grids are connected to counter tube plates which are then positive. Thus, when the lead 390 is pulsed in a positive direction the bias is reduced on the thyratrons 385 to 388 in differing amounts depending upon the state of conduction of the associated stage of the decade. The magnitudes of the voltages are selected so that the thyratrons will fire only if the corresponding counter tube is conducting to indicate a count therein. If the counter tube is in its nonconducting state, that is with the right half non-conducting and the left conducting the corresponding thyratron is not fired. Once the thyratrons fire they continue to pass current regardless of subsequent voltage conditions on the grid and until the supply lead 395 is pulsed negative sufficiently to drive the plate potentials slightly negative with respect to cathode. The lead 395 is given a negative pulse sufficient to deenergize or extinguish the thyratrons just after each scan of a continuously operating scanner. The sequence of events is to first pulse the lead 395 negative to extinguish any then conducting thyratrons and thus clear the storing and indicating means of any previous indication, then immediately as voltage is restored to the lead 395, the lead 390 is pulsed positive to cause registration of the count last accumulated and then existing in the electronic counting means. Thus, the storing and indicating means is cleared and reset in a very short interval of time.

Each of the relays whose coils 396 are in the plate circuits of the thyratrons controls one or more single-pole double-throw switches. These are arranged in a matrix form, known as a contact matrix, so as to energize one of eleven leads according to the particular combination of relays which are energized. The thyratron 388 through its relay controls a first switch 400 which corresponds to a unit of count or the smallest increment provided by the decade. The second thyratron 387 corresponding to the second stage of the electronic counter control switches 401 and 402. Likewise, the third thyratron 386 corresponding to the third stage of the electronic counter 376 controls four switches 403, 404, 405, and 406 while the last thyratron 385 corresponding to the fourth stage controls switches 407, 408, 409, and 410.

If none of the relays or thyratrons are actuated, corresponding to the zero count in the counter, all of the switches are in the positions shown so that a lead entering at the switch 400 is connected through the switches to a lead at the line marked zero at the upper right hand corner of FIGURE XIX. Likewise, if the first thyratron 388 only is energized the circuit may be traced from the switch 400 through the switch 401 to the switch 404 and thence out through the lead marked with the numeral 1. Other combinations of values may be similarly traced each one corresponding to the count then registered by the thyratrons which is according to the count in the electronic counter 376 at the time the thyratron circuit was pulsed to take or transfer the reading from the counter to the thyratrons. The output leads from the switches may be used to provide various types of indication such as incandescent lamps energized from each and marked with the corresponding numerical values or they may be edge lighted transparent panels each engraved with the corresponding number so as to present the various digits in superimposed position the one whose light is energized being prominent and the others very dim if visible at all. Likewise, the leads may be taken to solenoids mounted over the individual keys of an ordinary adding machine so that one solenoid for each row of keys is energized to operate the corresponding adding machine key. Once the solenoids are all energized an operating signal may be transmitted to the motor bar to record the indication.

The signals for operating the thyratrons particularly the pulse voltages for the leads 390 and 395 are obtained from the circuit illustrated in the lower half of FIGURE VII which was mentioned previously but was not described in detail. Referring to this figure, voltage at approximately 230 volts positive with respect to ground is fed to the circuit over a lead 411. This lead supplies current to a first voltage divider comprising resistors 412, 413, 414 the latter two being by-passed with a glow discharge voltage regulator tube 415. The voltage regulator tube 415 provides the supply voltage for the B+ lead of the pulse amplifier and shaping circuits illustrated in the upper half of FIGURE VII. Also, through the voltage divider comprising resistors 413 and 414, the regulator tube 415 provides a reference voltage for a first grid 416 of an amplifier for a voltage regulator circuit that includes a series regulator tube 417. The regulator tube 417 has its plate and screen connected to the positive lead 411, has its cathode 418 connected to the thyratron supply lead 395 and also to a plate 419 of the amplifier 420. The amplifier 420 is cathode coupled and has a cathode resistor 421 connected between the cathodes of the tube and ground. It also includes a plate resistor 422 serving a plate 423 of the second half of the tube, the plate 423 being directly connected to a grid 424 of the series regulator tube 417. A grid 425 is supplied with voltage from a voltage divider 426, 427 having the second resistor 427 by-passed with condenser 428. In this arrangement any increase in voltage at the cathode 418 of the regulator tube results in increased current flow through the left half of the tube 420 thus causing more plate current through the plate resistor 422 and dropping the voltage on the grid 424 of the regulator tube thus decreasing the current flow through the tube and dropping the voltage on the cathode 418. The circuit is thus self-regulating and tends to maintain a constant voltage on the lead 395 regardless of ordinary changes in voltage on the supply lead 411.

The bias voltage for the lead 390 is obtained from the cathode of an amplifier tube 430, a plate of which is tied directly to the positive lead 411 and the cathode of which is connected through a resistor 431 to a negative voltage lead 188. A grid of the amplifier 430 is tied to a voltage divider extending from the negative lead 188 to ground and a portion of such divider is made adjustable so that the cathode potential of the amplifier 430, which feeds the bias lead 390, may be adjusted to a desired operating condition depending upon the bias requirements of the thyratrons.

As was mentioned previously the rectifier 167 of FIGURE VII acts in combination with the voltage divider 170 and 171, and condenser 168 to drive the grid 169 of the Schmidt trigger circuit negative during the duration of a pulse train on the scanner. Because of the trigger action the voltage on the output lead 172 of the trigger circuit consists of a sharply negative going step at a start of a scan, remaining negative until the receipt of pulses from the scanning device stops and then, a short time later, returning in a positive direction as the trigger circuit recovers. This step of voltage is transmitted through the lead 172 and condenser 432 to a first grid 433 of an amplifier 434. The control grid 433 of the amplifier 434 has its potential stabilized by voltage divider resistors connected between a positive voltage lead 435, held at approximately 170 volts positive with respect to ground, and ground. The first negative going portion of the voltage wave on the lead 172 has no effect on the amplifier 434 except to partially charge the condenser 432 through the voltage divider. This is because the amplifier is already biased to cutoff and a negative signal cannot change the condition. At the end of the scan when the voltage on the lead 172 goes sharply positive a positive pulse of voltage is applied to the grid 433, amplified through the left half of the tube and applied through lead 436 and coupling condenser 437 to a control grid of the amplifier 430. Since the voltage was positive at the amplifier input grid 433 this results in a negative pulse of voltage at the control grid of the amplifier 430 thus tending to increase the bias voltage on the lead 390 by driving the control grid of the amplifier 430 and consequently its cathode negative with respect to their initial conditions. This charges the coupling condenser 437 which in combination with a grid leak resistor 438 has a short time constant so that upon the decay of the pulse as determined by the time constant of the condenser 432 of the amplifier 434, the grid of amplifier 430 is driven positive so as to apply a positive potential momentarily to the line 390. However, this positive potential is delayed until the recovery of the pulse rather than occurring simultaneously with the pulse.

The negative going pulse on the lead 436 is also transmitted through a coupling condenser 439 and resistor 440 to the second grid of the amplifier 434 where it is amplified and transmitted through output lead 441 as a positive pulse and applied to a control grid 442 of an amplifier 443. The output of the amplifier 443 is transmitted through a coupling condenser 444 to the control grid 424 of the regulator tube 417. The pulse at the end of the wave train thus appears at the grid 424 as a negative going pulse sufficient to cutoff the flow of current through the regulator tube and thus drop the potential on the lead 395 to ground or nearly to ground thereby extinguishing any of the thyratrons that might be conducting. The extinguishing time for the thyratrons is short compared to the time constants of the circuits involved through the amplifier 434 and 443 so that the thyratrons are definitely extinguished before the supply voltage is re-established at the end of the pulse and the grid bias voltage on lead 390 pulsed positive.

This circuit in combination with the thyratron and relay circuits shown in FIGURE XIX provides a storage type of indication in that the relays are held in operated or non-operating condition from cycle to cycle and are changed only when there is a change in indication of the scale. This follows because the time during which the thyratrons are deenergized until they are reenergized in the next cycle is very short compared to the drop out time of the relays. Thus, a relay will operate only when it is necessary to follow an actual change in indication between one scan and the next.

This circuit including the relay matrix, shown in FIGURE XIX, may be used to operate a ten-key adding machine or punch card equipment or electrical typewriters by arranging a stepping switch to sequentially scan the output leads of the various relay matrices in order to operate the corresponding adding machine or typewriter keys. However, economy of structure may be obtained by using a stepping switch at the input to the thyratrons and substituting vacuum tubes for the thyratrons and employing only one series of relays. Such a circuit is illustrated in FIGURE XX wherein leads 451 to 454 inclusive including series resistors are connected to corresponding taps of a stepping switch illustrated generally as 455. While leads from only one decade are illustrated it is to be understood that other decades will be connected to the other sets of terminals in order starting with the higher value order first and continuing through to the lowest in the direction of motion of the stepping relay. Wiper arms 456 to 459 are connected directly to control grids 460, 461, 462, 463 of triode amplifiers 464, 465, 466 and 467. The control grids of the amplifiers are also connected to bias leads through resistors 468. The bias voltage is adjusted so that the corresponding amplifier tubes will draw current if their grids are connected to a lead connected to a nonconducting portion of the associated electronic counter decade so as to provide a positive voltage at the leads 451 to 454. Thus the amplifiers 464 to 467 will repeat the condition of the electronic counter decade to which their grids are connected through the stepping switch 455. Each of the amplifiers 464 to 467 inclusive includes a relay coil in its plate circuit the relay coils being similar to those shown in FIGURE XIX and adapted to operate contacts or switches arranged in a matrix so as to provide a circuit from an input lead 469 to selected ones of output leads 470. The output leads 470 may be connected to solenoids arranged to operate an ordinary ten-key adding machine, keys of an electric typewriter, or keys or controls of card punching equipment. Additional controls to regulate the stepping of the stepping switch may be included as dictated by the associated equipment. Such controls are not indicated in the diagrams because they vary according to the equipment to be driven.

In this circuit it is necessary when the stepping switch is being stepped along to transfer counter indications to the printing or indicating devices that the counter itself be disabled. This is done by paralyzing the input amplifier and shaper circuit and simultaneously paralyzing the reset circuit so that the counter cannot operate.

Various modifications and variations in details of the various portions of the structure may be made without departing from the scope of the invention.

Having described the invention, we claim:

1. In combination, a weighing scale, scanning means connected to the weighing scale and adapted to generate a series of electrical pulses proportional in number to the load on the weighing scale, a pulse generator connected to said scanning means and adapted to deliver a predetermined number of pulses for each said electrical pulse, means for selecting pulses from said predetermined number, a first electronic counter connected to count the selected pulses, a second electronic counter connected to count the last pulse of each said predetermined number of pulses, and means for resetting the counters before each scan, whereby after a scan the first counter indicates the product of the scale indication multiplied by a selected factor and the second counter indicates the scale indication.

2. A computing scale according to claim 1 in which selected pulses are applied to several orders of the counter and means jointly responsive to ultimate pulses of said series of pulses and to output pulses of lower orders of the counter for applying carry pulses to a next higher order of the counter.

3. In combination, a condition responsive member, means for generating a train of electrical pulses proportional in number to the magnitude of the response of said condition responsive member from a reference condition, an electronic counter for counting and indicating the number of pulses in the train of pulses, means for generating a series of puses for each electrical pulse in the train of pulses, a second electronic counter, and settable means for selecting certain pulses of the series of pulses and applying such pulses to the second counter.

References Cited in the file of this patent

UNITED STATES PATENTS

| 2,046,005 | Sprecker | June 30, 1936 |
| 2,376,234 | DeCastro | May 15, 1945 |
| 2,393,186 | Potter | Jan. 15, 1946 |

(Other references on following page)

UNITED STATES PATENTS

| | | |
|---|---|---|
| 2,431,591 | Snyder | Nov. 25, 1947 |
| 2,523,516 | Potter | Sept. 16, 1950 |
| 2,605,694 | Moss | Aug. 5, 1952 |
| 2,673,060 | Svensson | Mar. 23, 1954 |
| 2,717,987 | Hagen | Sept. 13, 1955 |
| 2,803,448 | Biebel | Aug. 20, 1957 |
| 2,860,867 | Allen et al. | Nov. 18, 1958 |
| 2,938,126 | Adler | May 24, 1960 |

FOREIGN PATENTS

| | | |
|---|---|---|
| 595,871 | Germany | Apr. 23, 1934 |
| 23,234 | Australia | July 27, 1936 |
| 749,836 | England | June 6, 1956 |